(12) United States Patent
Fan et al.

(10) Patent No.: US 9,957,163 B2
(45) Date of Patent: May 1, 2018

(54) METHOD FOR MANUFACTURING OF THREE-DIMENSIONAL FREESTANDING POROUS THIN-GRAPHITE WITH HIERARCHICAL POROSITY

(71) Applicant: Board of Regents, The University of Texas System, Austin, TX (US)

(72) Inventors: Donglei Fan, Austin, TX (US); Jing Ning, Austin, TX (US); Xiaobin Xu, Austin, TX (US); Jianhe Guo, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days. days.

(21) Appl. No.: 14/738,301

(22) Filed: Jun. 12, 2015

(65) Prior Publication Data

US 2015/0360952 A1    Dec. 17, 2015

Related U.S. Application Data

(60) Provisional application No. 62/011,383, filed on Jun. 12, 2014.

(51) Int. Cl.
*C01B 31/04* (2006.01)
*H01G 11/24* (2013.01)
*H01G 11/32* (2013.01)
*H01G 11/86* (2013.01)

(52) U.S. Cl.
CPC ............. *C01B 31/04* (2013.01); *H01G 11/24* (2013.01); *H01G 11/32* (2013.01); *H01G 11/86* (2013.01); *Y02E 60/13* (2013.01)

(58) Field of Classification Search
CPC ........ C01B 31/04; H01G 11/24; H01G 11/86; H01G 11/32
See application file for complete search history.

(56) References Cited

PUBLICATIONS

Liu, Zhuchen, et al. "Synthesis of three-dimensional graphene from petroleum asphalt by chemical vapor deposition." Materials Letters 122 (2014): 285-288.*
Meng, Yuena, et al. "Hierarchical porous graphene/polyaniline composite film with superior rate performance for flexible supercapacitors." Advanced Materials 25.48 (2013): 6985-6990.*
(Continued)

*Primary Examiner* — Richard M Rump
(74) *Attorney, Agent, or Firm* — Meunier Carlin & Curfman LLC

(57) ABSTRACT

The present invention includes an apparatus and a method of making a three dimensional graphite structure with a controlled porosity comprising: plating a metal layer on at least one of a nickel, an iron or a cobalt foam substrate; annealing the metal and the nickel, iron or cobalt foam into a porous metal-nickel, iron or cobalt catalyst, wherein the catalyst has a smooth and a porous surface; etching the smooth surface of the annealed porous metal-nickel, iron or cobalt catalyst; growing a carbonaceous layer on the porous surface of the annealed porous metal-nickel, iron or cobalt catalyst; and completely etching the porous metal-nickel, iron or cobalt catalyst to obtain the graphite layer.

19 Claims, 14 Drawing Sheets

(56) References Cited

PUBLICATIONS

Li, Shin-Ming, et al. "Electrochemical deposition of nanostructured manganese oxide on hierarchically porous graphene—carbon nanotube structure for ultrahigh-performance electrochemical capacitors." Journal of power sources 225 (2013): 347-355.*

Chen, Sheng, et al. "Hybrid hydrogels of porous graphene and nickel hydroxide as advanced supercapacitor materials." Chemistry—A European Journal 19.22 (2013): 7118-7124.*

Xia, Xinhui, et al. "A new type of porous graphite foams and their integrated composites with oxide/polymer core/shell nanowires for supercapacitors: structural design, fabrication, and full supercapacitor demonstrations." Nano letters 14.3 (2014): 1651-1658.*

Wu, Zhong-Shuai, et al. "Three-dimensional graphene-based macro- and mesoporous frameworks for high-performance electrochemical capacitive energy storage." Journal of the American Chemical Society 134.48 (2012): 19532-19535.*

Wang, Guoliang, et al. "Sorption and regeneration of magnetic exfoliated graphite as a new sorbent for oil pollution." Desalination 263.1 (2010): 183-188.*

Ji, Hengxing, et al. "Ultrathin graphite foam: a three-dimensional conductive network for battery electrodes." Nano letters 12.5 (2012): 2446-2451.*

Aricò; et al. "Nanostructured materials for advanced energy conversion and storage devices" Nat Mater, May 2005, 4, 366-377.

Baraton, et al. "Synthesis of few-layered graphene by ion implantation of carbon in nickel thin films" Nanotechnology 2011, 22, (8), 085601.

Barros, et al. "Raman spectroscopy of double-walled carbon nanotubes treated with H2SO4" Phys Rev B 2005, 71, (16).

Berger, et al. "Ultrathin epitaxial graphite: 2D electron gas properties and a route toward graphene-based nanoelectronics" The Journal of Physical Chemistry B 2004, 108, (52), 19912-19916.

Chen, et al. "High-Performance Nanostructured Supercapacitors on a Sponge" Nano Lett., published Sep. 16, 2011, 11, (12), 5165-5172.

Chen, et al. "Synthesis and Characterization of Large-Area Graphene and Graphite Films on Commercial CuNi Alloy Foils" Nano Lett., published Jul. 26, 2011, 11, (9), 3519-3525.

Dravid, et al. "Buckytubes and Derivatives: Their Growth and Implications for Buckyball Formation" Science, Mar. 12, 1993, vol. 259, (5101), 1601-1604.

Ebbesen, et al. "Large-scale synthesis of carbon nanotubes" Nature Jul. 16, 1992, 358, (6383), 220-222.

Ferrari, et al. "Raman Spectrum of Graphene and Graphene Layers" Physical Review Letters 2006, 97, (18).

Geim, et al. "Graphene calling" Nat Mater, Mar. 2007, 6, (3), 183-191.

Ghosh, et al. "Carbon-Based Electrochemical Capacitors" Chemsuschem, published online Mar. 2, 2012, 5, (3), 480-499.

Iijima, et al. "Single-shell carbon nanotubes of 1-nm diameter" Nature 1993, 363, (6430), 603-605.

Ji, et al. "Nanoporous Ni(OH) Thin Film on 3D Ultrathin-Graphite Foam for Asymmetric Supercapacitor" Acs Nano, published online Jun. 11, 2013, 7, (7), 6237-6243.

Jost, et al. "Knitted and screen printed carbon-fiber supercapacitors for applications in wearable electronics" Energy & Environmental Science 2013, 6, (9), 2698.

Jun, et al. "Synthesis of New, Nanoporous Carbon with Hexagonally Ordered Mesostructure" J Am Chem Soc, published on web Oct. 12, 2000, 122, (43), 10712-10713. (BUY).

Kroto, et al. "C60: Buckminsterfullerene" Nature, Nov. 14, 1985, 318, (6042), 162-163.

Lang, et al. "A facile approach to the preparation of loose-packed Ni(OH)2 nanoflake materials for electrochemical capacitors" J Solid State Electr, Feb. 2009, 13, 333-340.

Lee, et al. "Non-aqueous approach to the preparation of reduced graphene oxide/α-Ni(OH)2 hybrid composites and their high capacitance behavior" J. D. Chem Commun , first published online Apr. 11, 2011, 47, (22), 6305-6307.

Lee, et al. Supplementary Material for: "Non-aqueous approach to the preparation of reduced graphene oxide/α-Ni(OH)2 hybrid composites and their high capacitance behavior" J. D. Chem Commun , first published online Apr. 11, 2011, 47, (22), 6305-6307, 14 pages.

Lee, et al., "A Facile and Template-Free Hydrothermal Synthesis of Mn3O4 Nanorods on Graphene Sheets for Supercapacitor Electrodes with Long Cycle Stability" Chem Mater, published Feb. 21, 2012, 24, (6), 1158-1164.

Li, et al. "Large-Area Synthesis of High-Quality and Uniform Graphene Films on Copper Foils" Science, May 7, 2009, 324, (5932), 1312-1314.

Li, et al. "ALKBH4-dependent demethylation of actin regulates actomyosin dynamics" Nat Commun, Published May 14, 2013, 4, 1832.

Lu, et al. "Beta-phased Ni(OH)2 nanowall film with reversible capacitance higher than theoretical Faradic capacitance" Chem Commun 2011, 47, (34), 9651-9653.

McDonough, et al. "Carbon nanofiber supercapacitors with large areal capacitances" Appl Phys Lett 2009, 95, (24), 243109.

Murray, et al., "Introduction to Engineering Materials: Behavior: Properties, and Selection" Chapter 6, section 6.3, CRC Press: 2007.

Nair, et al. "Fine Structure Constant Defines Visual Transparency of Graphene" Science, Jun. 6, 2008, 320, (5881), 1308 & Supplementary Online Material for manuscript "Fine Structure Constant Defines Visual Transparency of Graphene".

Novoselov, et al. "Two-dimensional gas of massless Dirac fermions in graphene" Nature 2005, 438, (7065), 197-200.

Patil, et al. "Characterization of honeycomb-like "β-Ni(OH)2" thin films synthesized by chemical bath deposition method and their supercapacitor application" J Power Sources 2009, 188, (1), 338-342.

Pettes, et al. "Thermal Transport in Three-Dimensional Foam Architectures of Few-Layer Graphene and Ultrathin Graphite" Nano Lett., published May 21, 2012, 12, (6), 2959-2964.

Reina, et al. "Growth of large-area single- and bi-layer graphene by controlled carbon precipitation on polycrystalline ni surfaces" Nano Res 2009, 2, (6), 509-516.

Richey, et al. "Ion Dynamics in Porous Carbon Electrodes in Supercapacitors Using in Situ Infrared Spectroelectrochemistry" J. Am. Chem. Soc., published Aug. 5, 2013, 135, (34), 12818-12826. (BUY).

Simon, et al. "Where Do Batteries End and Supercapacitors Begin?" Science Mar. 14, 2014, 343, (6176), 1210-1211.

Treacy, et al. "Exceptionally high Young's modulus observed for individual carbon nanotubes" Nature, Jun. 20, 1996, 381, (6584), 678-680.

Wang, et al. "Ni(OH)2 nanoplates grown on graphene as advanced electrochemical pseudocapacitor materials" J. Am. Chem. Soc. 2010, 132, (21), 7472-7477.

Wang, et al. "Large-Diameter Graphene Nanotubes Synthesized Using Ni Nanowire Templates" Nano Lett, published on web: Oct. 28, 2010, 10, (12), 4844-4850.

Wang, et al. "3D Aperiodic Hierarchical Porous Graphitic Carbon Material for High-Rate Electrochemical Capacitive Energy Storage" Angew Chem Int Edit 2008, 47, (2), 373-376. (BUY).

Wang, et al. "Advanced asymmetrical supercapacitors based on graphene hybrid materials" J Nano Res 2011, 4, (8), 729-736.

Wang, Hailiang "Hybrid material design for energy applications: impact of graphene and carbon nanotubes" Pure Appl Chem 2014, 86, (1), 39-52.

Xie, et al. "Layer-by-layer β-Ni(OH)2/graphene nanohybrids for ultraflexible all-solid-state thin-film supercapacitors with high electrochemical performance" (available online Jul. 31, 2012) Nano Energy 2013, 2, (1), 65-74.

Xu, et al. "One-step strategy to graphene/Ni(OH)2 composite hydrogels as advanced three-dimensional supercapacitor electrode materials" Nano Res 2013, 6, (1), 65-76.

Yan, et al. Advanced Asymmetric Supercapacitors Based on Ni(OH)2 / Graphene and Porous Graphene Electrodes with High Energy DensityAdv Funct Mater 2012, 22, (12), 2632-2641.

Yan, et al. "Fabrication and electrochemical performances of hierarchical porous Ni(OH)2 nanoflakes anchored on graphene sheets" J Mater Chem 2012, 22, (23), 11494-11502.

(56) References Cited

OTHER PUBLICATIONS

Yang, et al. "Liquid-Mediated Dense Integration of Graphene Materials for Compact Capacitive Energy Storage" Science 2013, 341, (6145), 534-537.

Zhang, et al. "A 3D hierarchical porous α-Ni(OH)2/graphite nanosheet composite as an electrode material for supercapacitors" Journal of Materials Chemistry A, first published online Nov. 19, 2013, 2014, 2, 1524-1529.

Zhang, et al. Supplementary Material for: "A 3D hierarchical porous α-Ni(OH)2/graphite nanosheet composite as an electrode material for supercapacitors" Journal of Materials Chemistry A, first published online Nov. 19, 2013, 2014, 2, 2 pages.

Zheng, et al. "Paper supercapacitors by a solvent-free drawing method" Energ Environ Sci 2011, 4, (9), 3368-3373.

Zheng, et al. Supplementary Material for: "Paper supercapacitors by a solvent-free drawing method" Energ Environ Sci 2011, 4, (9), 3368-3373, 1 page.

Hakamada, et al. "Fabrication of carbon nanotube/NiOx(OH)y nanocomposite by pulsed electrodeposition for supercapacitor applications" Journal of Power Sources (2014), 245: 324-330.

Longinova, et al. "Factors influencing graphene growth on metal surfaces" New Journal of Physics 11, (published Jun. 24, 2009) 063046, 20 pp.

Kong, et al. "Facile approach to prepare loose-packed cobalt hydroxide nano-flakes materials for electrochemical capacitors" Journal of Power Sources 194 (2009) 1194-1201, available online Jun. 16, 2009.

Muñoz, et al. "Review of CVD Synthesis of Graphene" Chemical Vapor Deposition, first published online Nov. 6, 2013, 19, 297-322.

An, et al. "Low-temperature synthesis of Mn3O4 Nanoparticles loaded on multi-walled carbon nanotubes and their application in electrochemical capacitors" Nanotechnology 19, (published May 28, 2008).

Nam, et al. "Pseudocapacitive properties of eletrochemically prepared nickel oxides on 3-dimensional carbon nanotube film substrates" Journal of Power Sources, vol. 182, Issue 2, Aug. 1, 2008, pp. 642-652.

Levi, et al. "The mechanism of lithium intercalation in graphite film electrodes in aprotic media. Part 1. High resolution slow scan rate cyclic voltammetric studies and modeling" J Electroanal Chem 1997, 421, (1-2), 79-88.

Zhou, et al. "Synthesis and Capacitive Performances of Graphene/N-Doping Porous Carbon Composite with High Nitrogen Content and Two-Dimensional Nanoarchitecture" (published Oct. 1, 2012) Int J Electrochem Sci 7:9984-9996.

\* cited by examiner

FIG. 1G
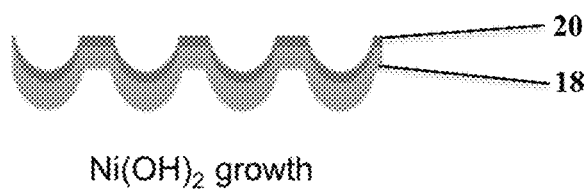
Ni(OH)₂ growth
FIG. 1H
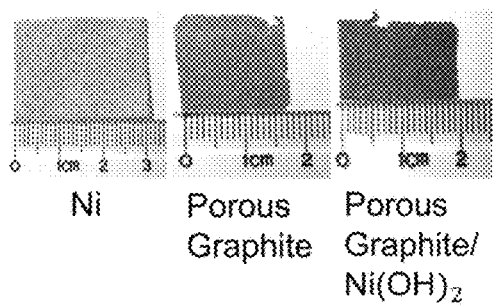
Ni    Porous    Porous
      Graphite  Graphite/
                Ni(OH)₂
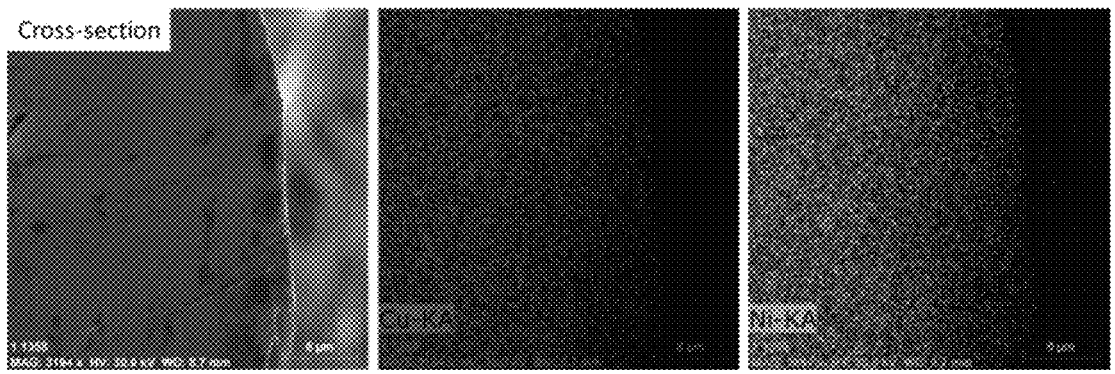
FIG. 1I

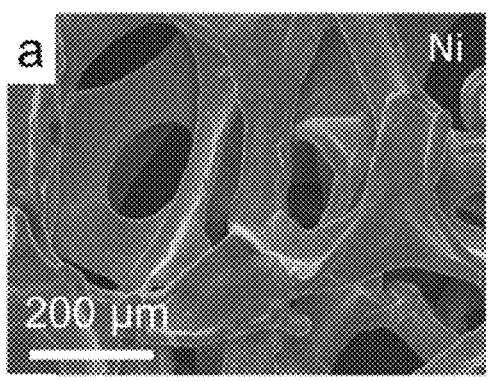
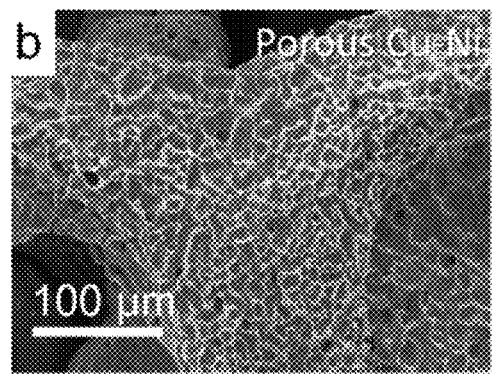
FIG. 2A　　　　　　　　　FIG. 2B
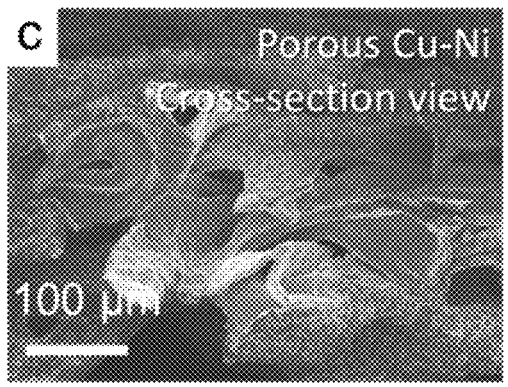
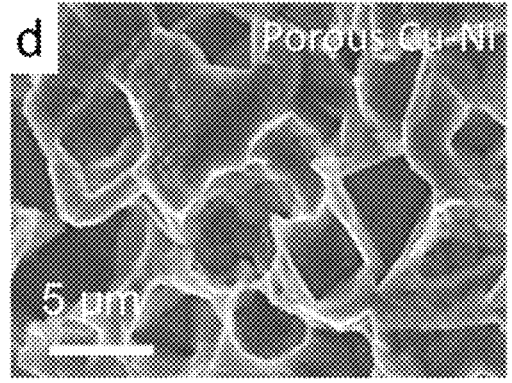
FIG. 2C　　　　　　　　　FIG. 2D
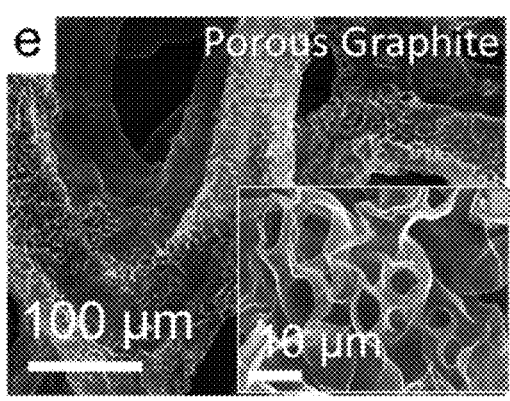
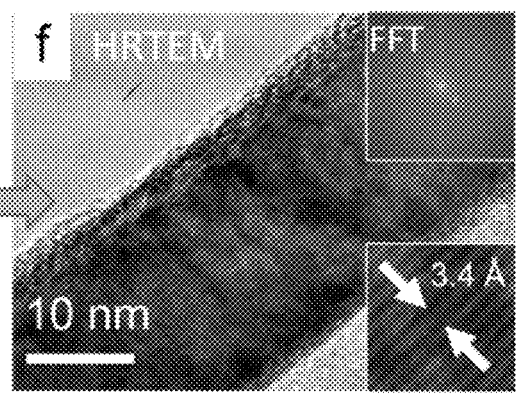
FIG. 2E　　　　　　　　　FIG. 2F
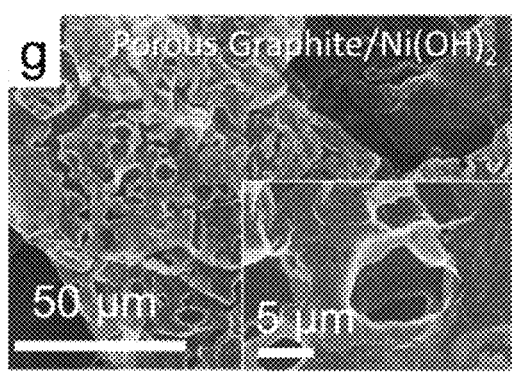
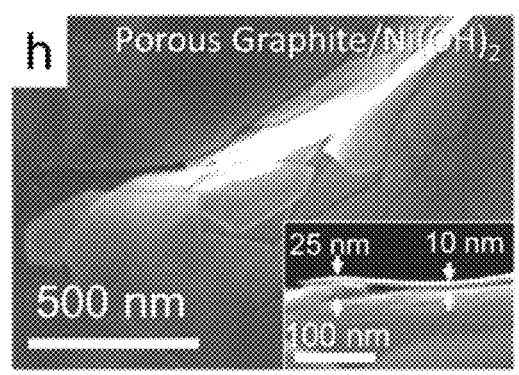
FIG. 2G　　　　　　　　　FIG. 2H

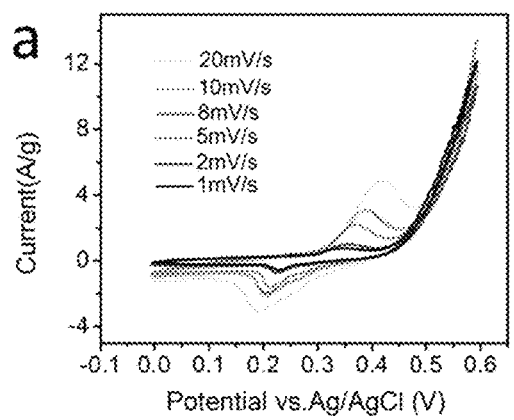
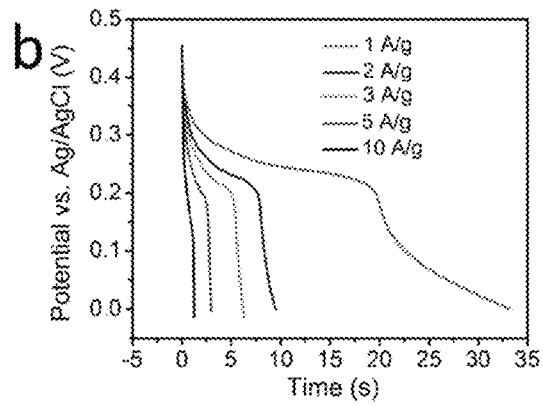
FIG. 4G-A              FIG. 4G-B
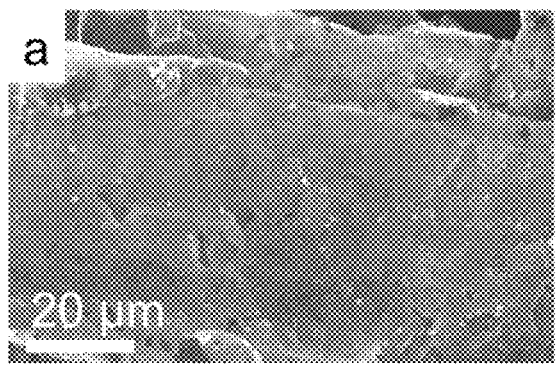
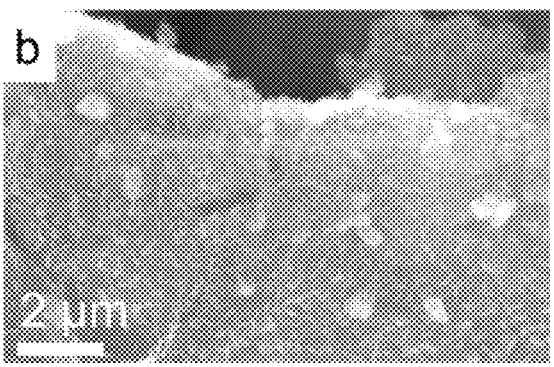
FIGS. 4H-A to 4H-B
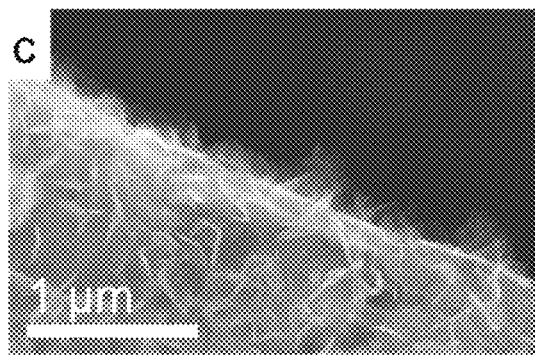
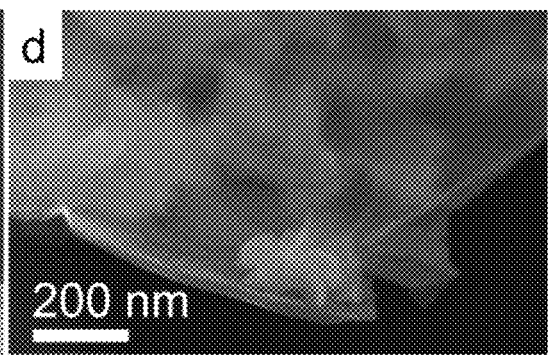
FIGS. 4H-C to 4H-D

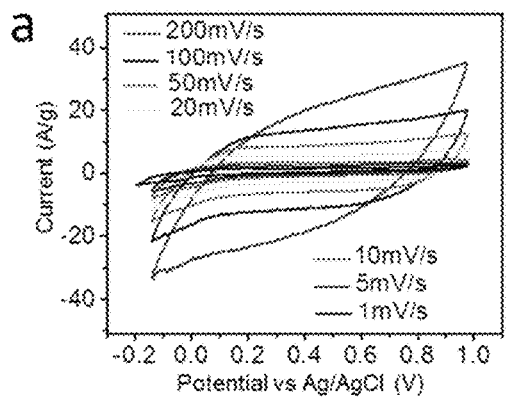 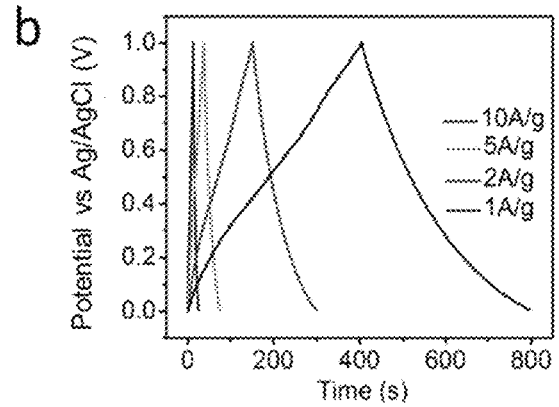
FIG. 8A  FIG. 8B
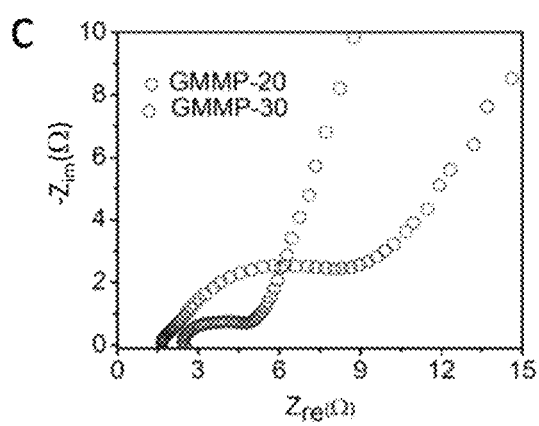 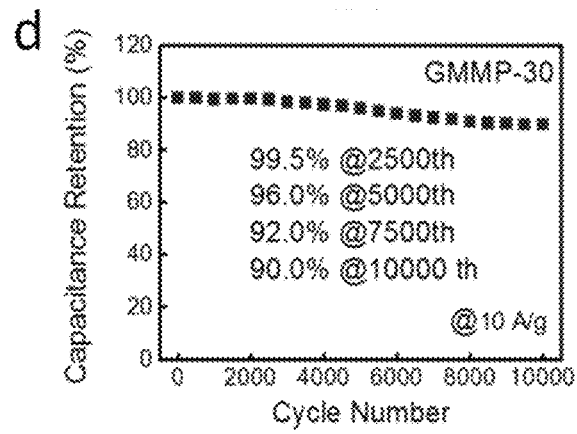
FIG. 8C  FIG. 8D
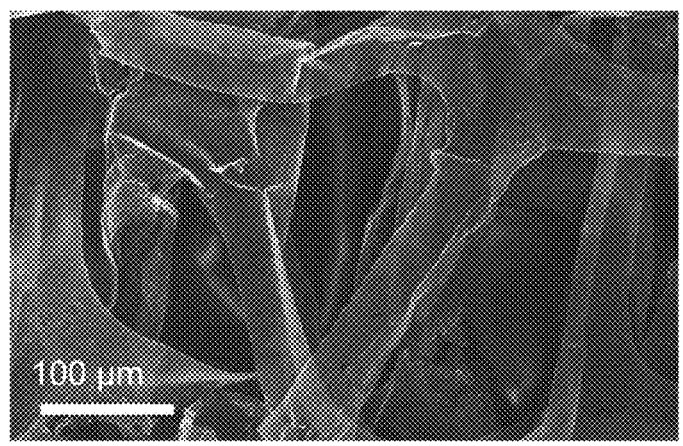
FIG. 9

METHOD FOR MANUFACTURING OF THREE-DIMENSIONAL FREESTANDING POROUS THIN-GRAPHITE WITH HIERARCHICAL POROSITY

CROSS-REFERENCE TO RELATED APPLICATIONS

This application claims benefit of U.S. Provisional Application Ser. No. 62/011,383 filed Jun. 12, 2014, which is incorporated herein by reference in its entirety.

STATEMENT OF FEDERALLY FUNDED RESEARCH

This invention was made with government support under Grant No. CMMI1150767 awarded by the National Science Foundation. The government has certain rights in the invention.

TECHNICAL FIELD OF THE INVENTION

The present invention relates in general to the field of three-dimensional manufacturing, and more particularly, to a novel method for manufacturing of three-dimensional freestanding porous thin-graphite with hierarchical porosity.

BACKGROUND OF THE INVENTION

Without limiting the scope of the invention, its background is described in connection with three-dimensional carbon-based structures.

The fast depletion of fossil energy and the associated adverse environmental impacts make it highly desirable to explore renewable-energy technologies. Carbonaceous materials with various morphologies and chemistries, such as carbon nanotubes[1-3], bucky balls[4,5], graphene[6-8], and thin graphite[9-12], have emerged as key structures for energy storage and conversion devices[13-17]. Among them, thin graphite has received considerable interest as electrode supports owing to their high electric conductivity, excellent mechanical durability, and ultra-low mass density[9,18]. However, it remains a challenge to rationally and efficiently synthesize carbonaceous materials into 3-D porous nanosuperstructures, which boast both high specific surface areas and fast ionic transports that significantly improve the performance of energy devices.

Previously, intensive research demonstrated the ultra-large specific surface area of graphene and its usage in energy devices, such as supercapacitors[19,20]. Nevertheless, the assembly of graphene sheets is difficult to control, which could reduce the actual available surface areas and thus lower the device performance[21]. Recently, commercially available 3-D nickel foams were employed as catalysts for the synthesis of 3-D thin graphite[22]. Although this approach resolved the assembly problem of carbonaceous materials as electrodes for energy devices, the feature size of the as-obtained graphite resides at a scale of ~100 μm. Complex chemical synthesis can produce porous carbon with pore sizes of a few nanometers[23]. Nevertheless, it remains extremely difficult to achieve 3-D carbonaceous nanostructures with multilevel porosity, which promises high surface areas and enhanced ionic transport[24].

SUMMARY OF THE INVENTION

In one embodiment, the present invention includes a method of making a three dimensional graphite structure with a controlled porosity comprising: plating a metal layer on at least one of a nickel, an iron or a cobalt foam substrate; annealing the metal and the nickel, iron or cobalt foam into a porous metal-nickel, iron or cobalt catalyst, wherein the catalyst has a smooth surface and an embedded porous microstructure under the surface; etching the smooth surface of the annealed porous metal-nickel, iron or cobalt catalyst; the porous microstructures can be readily exposed, then growing a carbonaceous layer on the porous surfaces of the annealed metal-nickel, iron or cobalt catalyst; and completely etching the porous metal-nickel, iron or cobalt catalyst to obtain the graphite layer. In one aspect, the carbonaceous layer is graphene or graphite that is deposited on the annealed porous copper-nickel catalyst by at least one of chemical vapor deposition, plasma enhanced chemical vapor deposition or sputtering. In another aspect, the metal is a catalyst for graphene/graphite growth. In another aspect, the step of plating the metal is selected from at least one of electroplating or electroless plating. In another aspect, the metal is selected from at least one of copper, nickel, iron, cobalt, gold, platinum, or rhodium, but different from the foam material. In another aspect, the carbonaceous layer is deposited on the annealed porous copper-nickel catalyst by chemical vapor deposition in ethylene at between 600-700° C. In another aspect, the carbonaceous layer is graphite. In another aspect, the carbonaceous layer is freestanding and flexible. In another aspect, the conductivity of the graphite structure with 2 μm porosity is improved by 3 times when compared to that of the graphite structure without porosity. In another aspect, the further comprises the step of growing a metal hydroxide layer on the graphite layer. In another aspect, the method further comprising the step of growing at least one of a metal hydroxide, an oxide or a sulfide layer on the graphite layer, wherein the metal hydroxide/oxide/sulfide is selected from at least one of Ruthenium(IV) oxide; Aluminum hydroxide; Beryllium hydroxide; Cobalt(II) hydroxide; Cobalt oxide; Copper(II) hydroxide; Copper oxide; Curium hydroxide; Gold(III) hydroxide; Iron(II) hydroxide; Iron oxide; Mercury(II) hydroxide; Nickel(II) hydroxide; Nickel oxide; Nickel sulfide; Manganese oxide ($MnO_2$ or $Mn_3O_4$); Manganese sulfide; Tin(II) hydroxide; Tin(IV) Oxide; Uranyl hydroxide; Zinc hydroxide; Zirconium(IV) hydroxide; Gallium(III) hydroxide; Lead(II) hydroxide; or Thallium hydroxide. In another aspect, the carbonaceous layer is formed into an electrode support for metal hydroxide supercapacitors. In another aspect, the carbonaceous layer with a metal hydroxide/oxide/sulfide is formed into an electrode having a specific capacitance of at least 1149 F/g at a current density of 1.5 A/g. In another aspect, the carbonaceous layer with a metal hydroxide/oxide/sulfide is formed into an electrode having at least 97.5% capacitance retention after 4,000 cycles. In another aspect, the carbonaceous layer with a metal hydroxide/oxide/sulfide is formed into an electrode having at least 90% capacitance after 10,000 cycles. In another aspect, the method further comprises the step of adjusting the porosity of the nickel foam substrate to change the porosity of the graphite layer by at least one of controlling the copper deposition amount, annealing temperature, and annealing time. In another aspect, the step of etching the porous metal-nickel, iron or cobalt catalyst is defined further as selecting an etching agent that etches the annealed porous metal-nickel, iron or cobalt. In another aspect, the step of etching the porous metal-nickel, iron or cobalt catalyst is defined further as etching the copper-nickel catalyst in 1 M iron chloride ($FeCl_3$) and 2 M hydrochloride (HCl) at 50-80° C. overnight.

In another embodiment, the present invention includes a method of making an electrode from a three dimensional graphite structure with a controlled porosity comprising: annealing a metal and the nickel, iron or cobalt foam into a porous metal-nickel, iron or cobalt catalyst, wherein the catalyst has a smooth surface and an embedded porous microstructure under the surface; etching the smooth surface of the annealed porous metal-nickel, iron or cobalt catalyst; the porous microstructures can be readily exposed, then growing a carbonaceous layer on the porous surfaces of the annealed metal-nickel, iron or cobalt catalyst; and completely etching the porous metal-nickel, iron or cobalt catalyst to obtain the graphite layer; and growing at least one of a metal hydroxide, an oxide, or a sulfide layer on the graphite layer. In one aspect, the graphite is deposited on the annealed porous copper-nickel catalyst by at least one of chemical vapor deposition, plasma enhanced chemical vapor deposition or sputtering. In another aspect, the metal is a catalyst for graphene/graphite growth. In another aspect, the metal is at least one of copper, nickel, iron, cobalt, gold, platinum, or rhodium, but different from the foam material. In another aspect, the graphite is deposited on the annealed porous copper-nickel catalyst by chemical vapor deposition in ethylene at between 600-700° C. In another aspect, the graphite layer is freestanding and flexible. In another aspect, the conductivity of the graphite structure with 2 μm porosity is improved by 3 times when compared to that of a graphite structure without porosity. In another aspect, the graphite layer is formed into an electrode support for metal hydroxide supercapacitors. In another aspect, the at least one of metal hydroxide, oxide or sulfide layer is selected from at least one of Ruthenium(IV) oxide; Aluminum hydroxide; Beryllium hydroxide; Cobalt(II) hydroxide; Cobalt oxide; Copper(II) hydroxide; Copper oxide; Curium hydroxide; Gold(III) hydroxide; Iron(II) hydroxide; Iron oxide; Mercury(II) hydroxide; Nickel(II) hydroxide; Nickel oxide; Nickel sulfide; Manganese oxide ($MnO_2$ or $Mn_3O_4$); Manganese sulfide; Tin(II) hydroxide; Tin(IV) Oxide; Uranyl hydroxide; Zinc hydroxide; Zirconium(IV) hydroxide; Gallium(III) hydroxide; Lead(II) hydroxide; or Thallium hydroxide. In another aspect, the graphite layer with a metal hydroxide/oxide/sulfide is formed into an electrode having a specific capacitance of at least 1149 F/g at a current density of 1.5 A/g. In another aspect, the graphite layer with a metal hydroxide/oxide/sulfide is formed into an electrode having at least 97.5% capacitance retention after 4,000 cycles. In another aspect, the graphite layer with a metal hydroxide/oxide/sulfide is formed into an electrode having at least 90% capacitance after 10,000 cycles. In another aspect, the method further comprises the step of adjusting the porosity of the nickel foam substrate to change the porosity of the graphite layer by controlling at least one of the copper deposition amount, annealing temperature, and annealing time. In another aspect, the step of etching the copper-nickel catalyst is defined further as selecting an etching agent that etches the annealed porous noble metal-nickel, iron or cobalt. In another aspect, the step of etching the copper-nickel catalyst is defined further as etching the copper-nickel catalyst in 1 M iron chloride ($FeCl_3$) and 2 M hydrochloride (HCl) at 50-80° C. overnight.

Yet another embodiment of the present invention includes a three dimensional graphite structure with a controlled porosity made by a method comprising: electroplating a metal layer on at least one of a nickel, an iron or a cobalt foam substrate; annealing the metal and the nickel, iron or cobalt foam into a porous metal-nickel, iron or cobalt catalyst, wherein the catalyst has a smooth and a porous surface; etching the smooth surface of the annealed porous metal-nickel, iron or cobalt catalyst; growing a graphite layer on porous surface of the annealed porous metal-nickel, iron or cobalt catalyst; and completely etching the porous metal-nickel, iron or cobalt catalyst to obtain the graphite layer. In one aspect, the graphite is deposited on the annealed porous copper-nickel catalyst by at least one of chemical vapor deposition, plasma enhanced chemical vapor deposition or sputtering. In another aspect, the metal is a catalyst for graphene/graphite growth. In another aspect, the metal is copper, nickel, iron, cobalt, gold, platinum, or rhodium, but different from the foam material. In another aspect, the step of plating the metal is selected from at least one of electroplating or electroless plating. In another aspect, the graphite is deposited on the annealed porous copper-nickel catalyst by chemical vapor deposition in ethylene at between 600-700° C. In another aspect, the graphite layer is freestanding and flexible. In another aspect, the conductivity of the graphite structure with 2 μm porosity is improved by 3 times when compared to that of a graphite structure without porosity. In another aspect, the method further comprises the step of growing a metal hydroxide layer on the graphite layer. In another aspect, the method further comprises the step of growing at least one of a metal hydroxide, an oxide or a sulfide layer on the graphite layer, wherein the metal hydroxide/oxide/sulfide is selected from at least one of Ruthenium(IV) oxide; Aluminum hydroxide; Beryllium hydroxide; Cobalt(II) hydroxide; Cobalt oxide; Copper(II) hydroxide; Copper oxide; Curium hydroxide; Gold(III) hydroxide; Iron(II) hydroxide; Iron oxide; Mercury(II) hydroxide; Nickel(II) hydroxide; Nickel oxide; Nickel sulfide; Manganese oxide ($MnO_2$ or $Mn_3O_4$); Manganese sulfide; Tin(II) hydroxide; Tin(IV) Oxide; Uranyl hydroxide; Zinc hydroxide; Zirconium(IV) hydroxide; Gallium(III) hydroxide; Lead(II) hydroxide; or Thallium hydroxide. In another aspect, the graphite layer is formed into an electrode support for metal hydroxide supercapacitors. In another aspect, the graphite layer with a metal hydroxide/oxide/sulfide is formed into an electrode having a specific capacitance of at least 1149 F/g at a current density of 1.5 A/g. In another aspect, the graphite layer with a metal hydroxide/oxide/sulfide is formed into an electrode having at least 97.5% capacitance retention after 4,000 cycles. In another aspect, the graphite layer with a metal hydroxide/oxide/sulfide is formed into an electrode having at least 90% capacitance after 10,000 cycles. In another aspect, the method further comprises the step of adjusting the porosity of the nickel foam substrate to change the porosity of the graphite layer by controlling at least one of the copper deposition amount, annealing temperature, and annealing time. In another aspect, the step of etching the copper-nickel catalyst is defined further as selecting an etching agent that etches the annealed porous noble metal-nickel, iron or cobalt. In another aspect, the step of etching the copper-nickel catalyst is defined further as etching the copper-nickel catalyst in 1 M iron chloride ($FeCl_3$) and 2 M hydrochloride (HCl) at 50-80° C. overnight.

BRIEF DESCRIPTION OF THE DRAWINGS

For a more complete understanding of the features and advantages of the present invention, reference is now made to the detailed description of the invention along with the accompanying figures and in which:

FIGS. 2A to 2H show: (FIG. 2A) SEM images of the original Ni foam, (FIG. 2B-2D) porosified foams made of Ni/Cu alloys, and (FIG. 2E) multilevel porous thin graphite, (FIG. 2F) Tunneling Electron Microscope (TEM) images of the cross-sections of multilevel porous graphite (Insets: Fast Fourier Transform (FFT) and High Resolution Tunneling Electron Microscope (HRTEM) image), and (FIG. 2G) SEM image of porous graphite/Ni(OH)$_2$, (FIG. 2H) morphology of Ni(OH)$_2$ grown on the multilevel porous graphite (Inset: sideview of graphite/Ni(OH)$_2$ shows the thickness of Ni(OH)$_2$ nanoplates).

(FIG. 3A) Raman spectrum of the as-obtained multilevel porous graphite and (FIG. 3B) the XRD of Ni(OH)$_2$ on the porous graphite.

(FIG. 4A, FIG. 4B) Cyclic voltammograms and galvanostatic discharging curves of porous graphite/Ni(OH)$_2$ electrodes in 3M KOH aqueous solution; (FIG. 4C) Specific capacitance of porous graphite/Ni(OH)$_2$ at various scan rates and discharge currents and (FIG. 4D) the specific capacity at various discharge currents based on the mass of the entire graphite/Ni(OH)$_2$ electrodes; (FIG. 4E) Nyquist plots of the porous graphite/Ni(OH)$_2$; (FIG. 4F) Cycling performance measured at a current density of 20 A/g in a potential range of 0 to 0.5 V. FIGS. 4G-A and 4G-B are cyclic voltammogram and galvanostatic discharging curves of Ni(OH)$_2$ on the non-porous 3-D graphite. FIGS. 4H-A to 4H-D are SEM images of Ni(OH)$_2$ nanostructures on the non-porous 3-D graphite.

(FIG. 5A) Raman spectrum of thin graphite with two-level porosity and (FIG. 5B) XRD of Mn$_3$O$_4$ grown on such a support.

FIGS. 8A to 8D show: (FIG. 8A) CV curves of the graphite/Mn$_3$O$_4$ with multilevel porosity (GMMP-20) at scanning rates from 1 to 200 mV/s. (FIG. 8B) Charging-discharging curves of the graphite/Mn$_3$O$_4$ with multilevel porosity (GMMP-20) from 1 to 10 A/g. (FIG. 8C) Nyquist plots of the graphite/Mn$_3$O$_4$ with multilevel porosity (GMMP-30) and (GMMP-20), (FIG. 8D) capacitive retention as a function of cycle numbers of the GMMP-30 at a current density of 10 A/g.

FIG. 9 shows an as-synthesized 3-D thin graphite with a single-level of porosity (100 µm in feature size) directly from the Ni foams.

(FIG. 10B) Charging-discharging curves of the graphite/Mn$_3$O$_4$ with single-level porosity (GMSP-30) from 1 to 10 A/g.

(FIGS. 11A-11C) sizes dependence of porosity on the Cu deposition amount, annealing temperature and annealing time, respectively; (FIG. 11D-11E), (FIGS. 11F-11G), (FIGS. 11H-11I) SEM images of Cu—Ni alloy foam with second level of porosity of ~2 µm, 5 µm, and 8 µm, respectively. (The scales bar in 11D, 11F, 11H are 20 µm and in 11E, 11G, 11I are 100 µm)

(FIG. 12A-12B), (FIG. 12C-12D), (FIG. 12E-12F) multilevel porous thin graphite with second level of porosity of ~2 µm, 5 µm, and 8 µm, respectively. (The scales bar in 12A, 12C, 12E are 20 µm and in 12B, 12D, 12F are 50 µm) (12G) the conductivity of multilevel porous thin graphite and single-level porous thin graphite at different densities.

DETAILED DESCRIPTION OF THE INVENTION

Figure 1A:
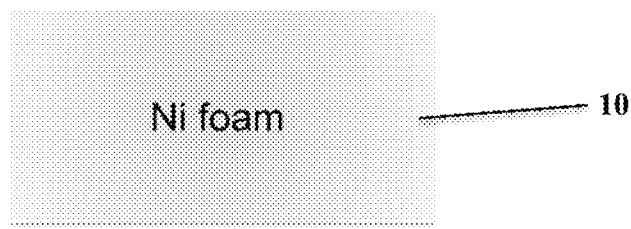
FIGS. 1A to 1D, the procedure for porosifying Ni—Cu catalysts, (FIGS. 1E-1F) 3-D porous thin graphite, and (FIG. 1G) growth of $Ni(OH)_2$ on porous graphite.
Figure 1B:
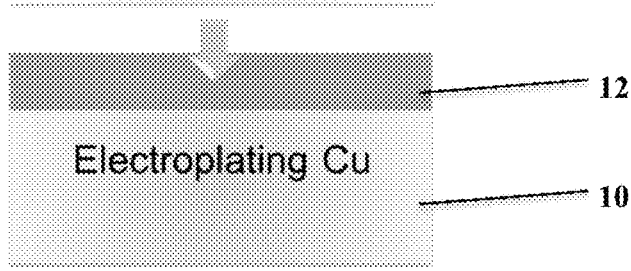
Figure 1C:
Figure 1D:
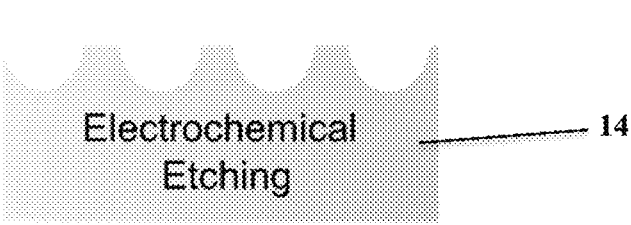
Figure 1E:
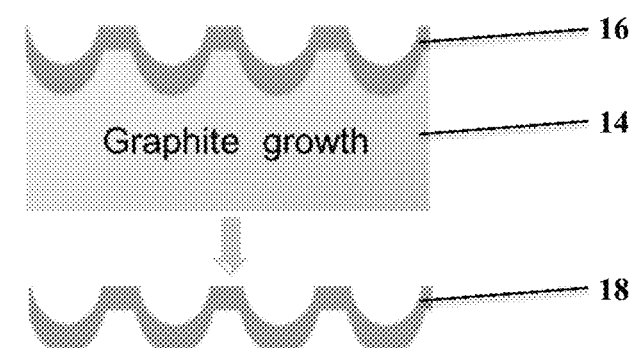
FIG. 1H are optical images of Ni foam, porous thin graphite, and porous graphite/Ni(OH)$_2$.
FIG. 1I is an Scanning Electron Microscope (SEM) image and Energy Dispersive Spetroscopy (EDS) mappings of the cross-section of Cu—Ni foam after annealing at 1000° C. using the method taught in FIGS. 1A to 1G.
Figure 1F:
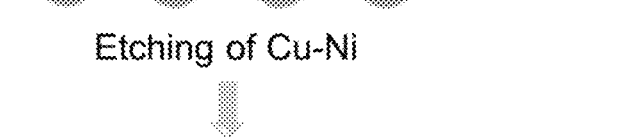

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, a "carbonaceous layer" may be formed from a variety of known carbonaceous materials, such as graphene, graphite, activated carbon, carbon black, or carbon containing structures or polymers that can be used for electronic devices, e.g., capacitors.

The present inventors describe herein an innovative mechanism for the synthesis of three-dimensional (3-D) thin-graphite superstructures with a controlled porosity from engineered catalysts and their applications in electrochemical supercapacitors. The 3-D thin-graphite nanostructures with two levels of porosity were synthesized by using porous nickel-copper (Ni—Cu) catalysts—engineered from Ni foams by an electrodeposition/etching process. The as-grown graphite is 3-D, multilevel porous, freestanding, and flexible after selective etching of the catalysts. Thin nickel hydroxide nanoplates [Ni(OH)$_2$] and manganese (II, III) oxide (Mn$_3$O$_4$) were grown on the 3-D graphite nanosuperstructures. The electrochemical tests showed a specific capacitance of ~1149 F/g (or 137 mAh/g in specific capacity) at a current density of 1.5 A/g, based on the entire weight of the graphite/Ni(OH)$_2$ electrodes. The devices also exhibit excellent cyclibility compared to previous work, with 97.5% retention after 4,000 cycles. The high performance of the device was attributed to the unique features of the as-synthesized porous graphite/Ni(OH)$_2$ electrodes. The graphite coated with Mn$_3$O$_4$ nanocrystals was demonstrated as electrodes for supercapacitors as well, which offers an ultrahigh specific capacitance of 407 F/g at 1 mV/s (or 399 F/g at 1 A/g), based on the total weight of the electrodes. It was also found that these devices also exhibit surprisingly long cycle stability with capacitance retentions of 99.5% and 90% after 2,500 and 10,000 charge-discharge cycles, respectively, at a rate of 10 A/g. The innovative mechanism for the synthesis of 3-D porous graphite is efficient, controllable, and has a low cost, which may potentially spur a new paradigm for manufacturing 3-D porous graphene/graphite materials for an array of energy storage and conversion applications.

The present invention includes a novel synthetic method and devices made therewith for large-scale thin graphite nanosuperstructures with multilevel porosity. The graphite was grown by Chemical Vapor Deposition (CVD) on 3-D porous Ni—Cu alloys, which were strategically engineered from the commercial Ni foams via an alloying-selective-etching process. The as-grown graphite was 3-D and freestanding with two levels of porosity of ~100 μm and less than 10 μm, respectively. The second level of porosity could be tuned from 2 μm to 8 μm by controlling the Cu deposition amount, annealing temperature or annealing time. It is demonstrated herein that this material as supports for nickel hydroxide [$Ni(OH)_2$] energy storage devices. A specific capacitance ~1149 F/g (or 137 mAh/g in specific capacity) was obtained at a current density of 1.5 A/g, based on the mass of the entire electrode of graphite/$Ni(OH)_2$. This value is among the highest of the state-of-the-art $Ni(OH)_2$ supercapacitor devices. Moreover, the porous graphite/$Ni(OH)_2$ exhibits excellent stability, with 97.5% specific capacitance retained after 4,000 charging-discharging cycles. We attribute these enhanced performances to the large specific surface area, excellent crystallinity, and high assembling quality of the 3-D porous graphite/$Ni(OH)_2$. A specific capacitance of 407 F/g at 1 mV/s (or 399 F/g at 1 A/g) was achieved based on the total mass of the porous graphite/$Mn_3O_4$ (GMMP) electrode. The GMMP exhibits long cycle stability, with 99.5% and 90% specific capacitance retained after 2,500 and 10,000 charging-discharging cycles, respectively. Thus, the present inventors provide a new paradigm for manufacturing 3-D carbonaceous nanosuperstructures for a number of energy-storage-and-conversion devices.

Figure 2I:
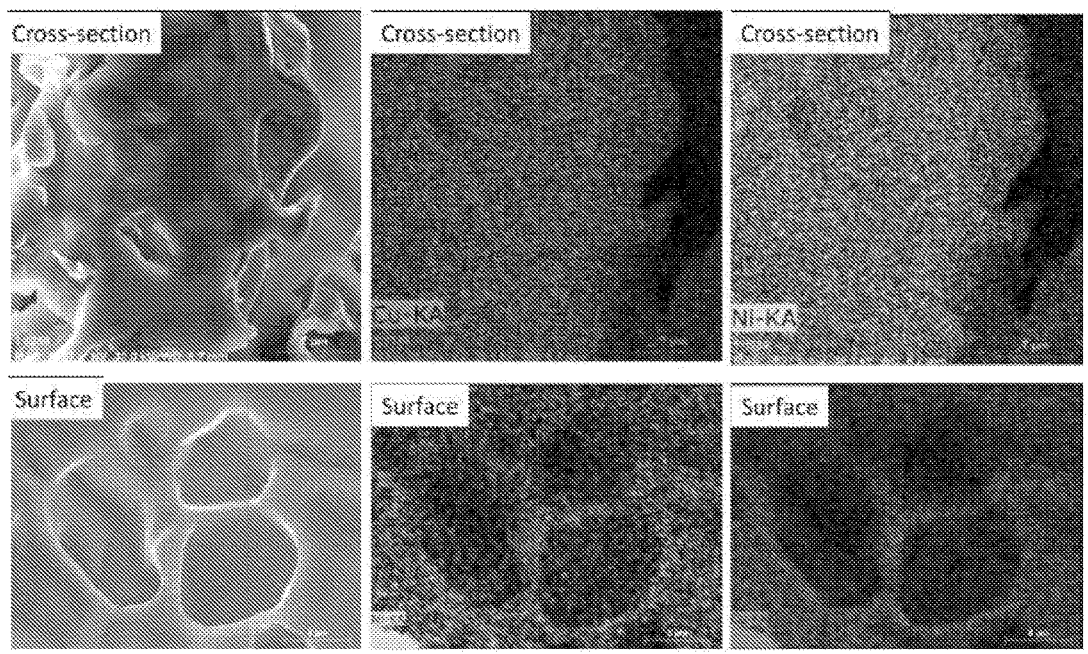
FIG. 2I are an SEM images and EDS mappings of the cross-sections and surfaces of porous Cu—Ni catalysts after electrochemical etching.
Figure 11A:
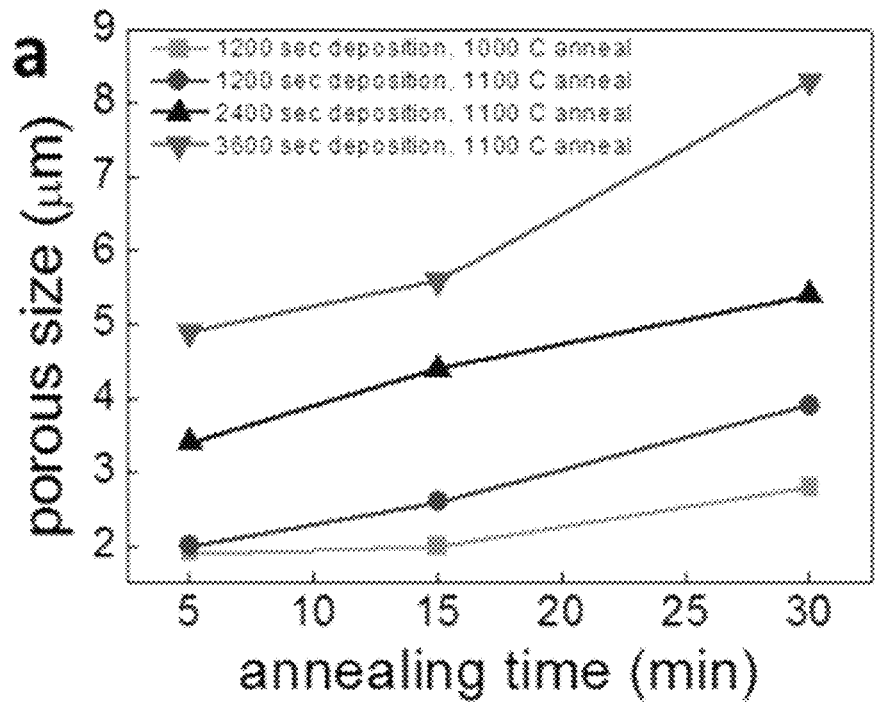
FIGS. 11A to 11I show.
Figure 11B:
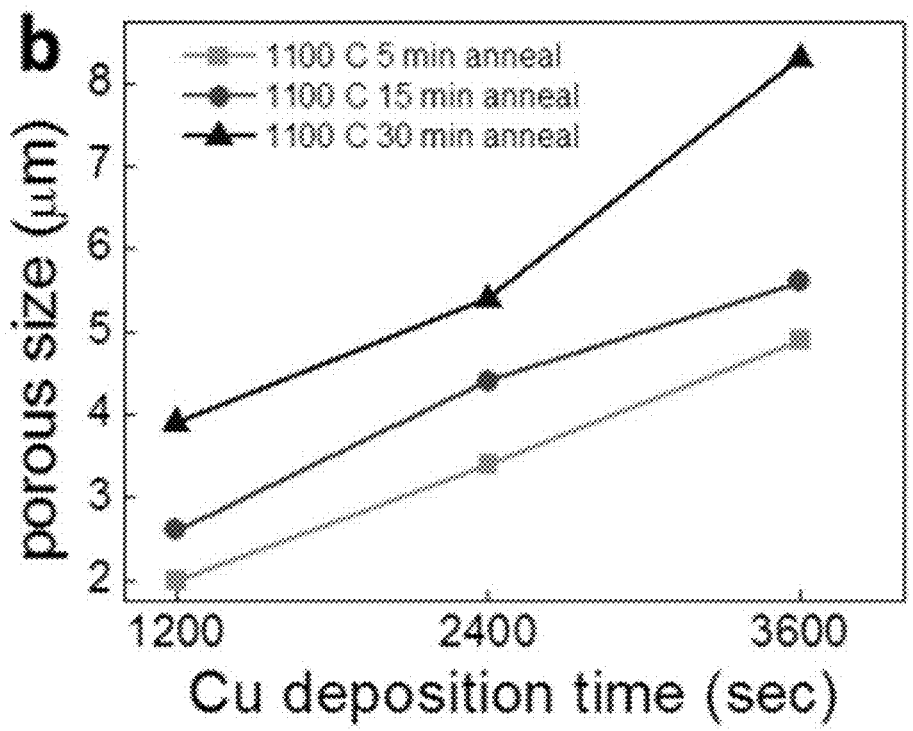
Figure 11C:
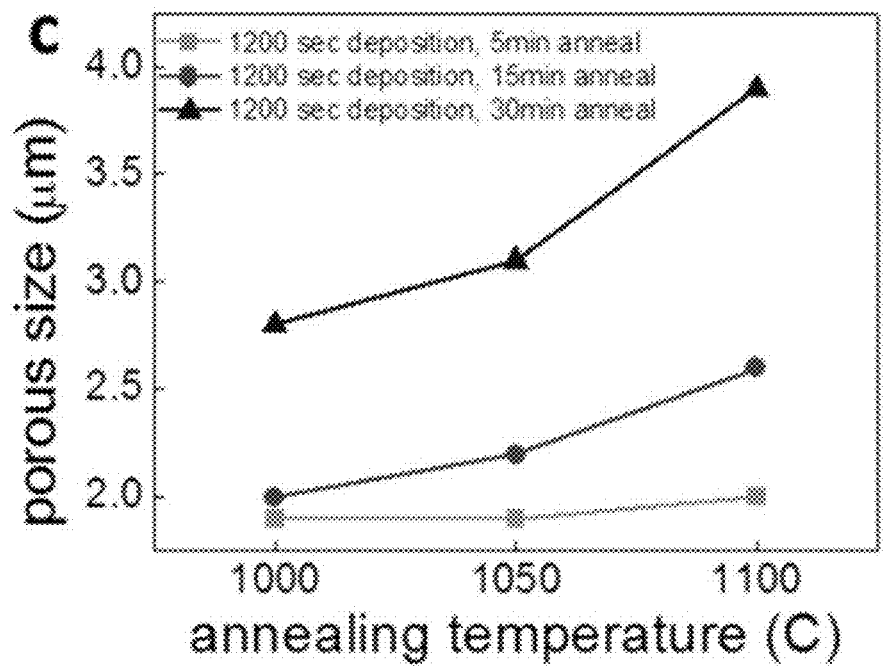
Figure 11D:
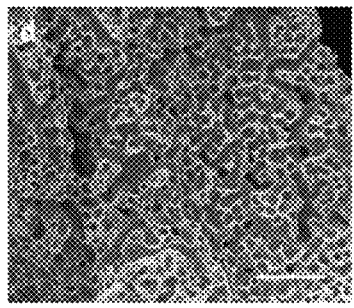
Figure 11F:
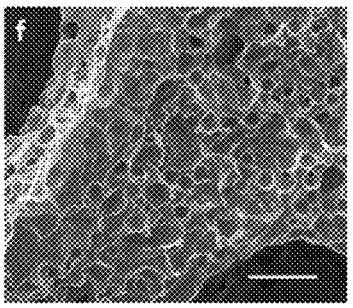
Figure 11H:
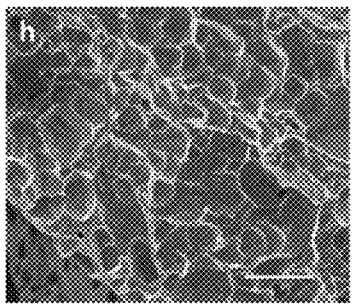
Figure 11E:
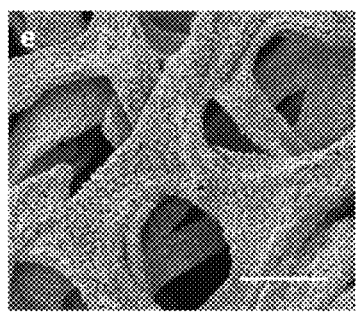
Figure 11G:
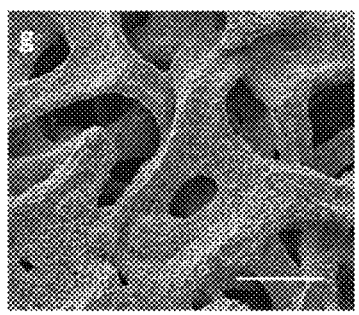
Figure 11I:
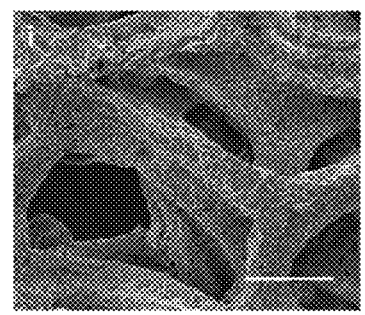

In one example, a 3-D porous graphite was catalyzed from a 3-D porous Cu—Ni superstructure, which was obtained by strategically porosifying commercially available 3-D Ni foams (10) via an alloying-etching approach [FIGS. 1A to 1G]. The approach includes three steps: firstly, an alloying element, in this example Cu, which was conformally coated (12) on the entire surface of 3-D Ni foams (10) by electrodeposition at −0.8 V (v.s. Ag/AgCl) for, e.g., 100 minutes from an electrolyte made of 2M $CuSO_4.5H_2O$, and 1 M $HBO_3$ FIGS. 1A-1B). The Cu thin films were deposited on all interconnected branches of the 3-D Ni foam with a thickness of approximately 5 μm. Next, the Cu—Ni composite was annealed (14) at a temperature of 1000° C. for interfacial atomic diffusion and alloying for 1 hour in Argon gas before cooled to the room temperature [FIG. 1C]. Energy-dispersive X-ray spectroscopy (EDX) showed that Cu is uniformly alloyed with Ni [FIG. 1I], as Cu is a material that is completely miscible with Ni[25]. Next, the Cu—Ni alloy foam was etched electrochemically at 0.6 V (v.s. Ag/AgCl) for 1000 sec, which resulted in arrays of micropores of ~5 μm on the 3-D surfaces of Cu—Ni foams [FIG. 1D and FIG. 2B]. Now, the feature size of the Ni foam was reduced from ~100 μm to 5 μm [FIGS. 2A-2D], an order of magnitude reduction. Cross-sectional SEM images revealed that more than two-thirds surfaces of Ni foams are porosified [FIG. 2C]. Brunauer-Emmett-Teller (BET) surface area characterization determined approximately 2-time increment of the total surface area from $5.3 \times 10^{-2}$ $m^2/cm^3$ to $9.6 \times 10^{-2}$ $m^2/cm^3$. The as-synthesized porous foams contained both Cu and Ni as shown in the EDX characterization [FIG. 2I]. The pore morphology and size could be readily tuned from 2 μm to 8 μm by the Cu deposition amount, annealing time, and annealing temperature [FIGS. 11D-11I]: the more Cu is deposited on the Ni foam, the larger the pore size is [FIG. 11A]; both the longer annealing time and the higher annealing temperature could also lead to lager pore size [FIGS. 11B-11C]. The pore density could also be controlled by the etching rate and etching time. The pore formation mechanism will be investigated and reported elsewhere.

Figure 3A:
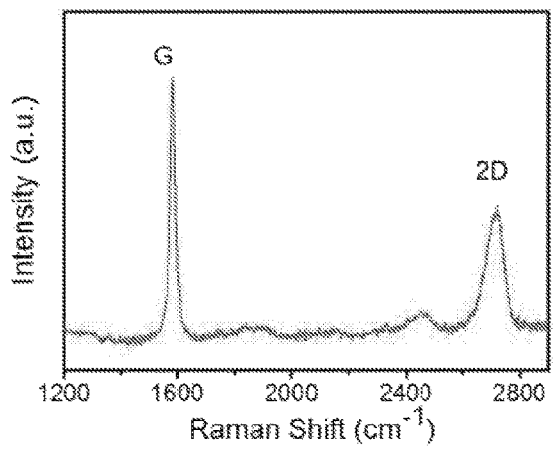
FIGS. 3A to 3B show.
Figure 3B:
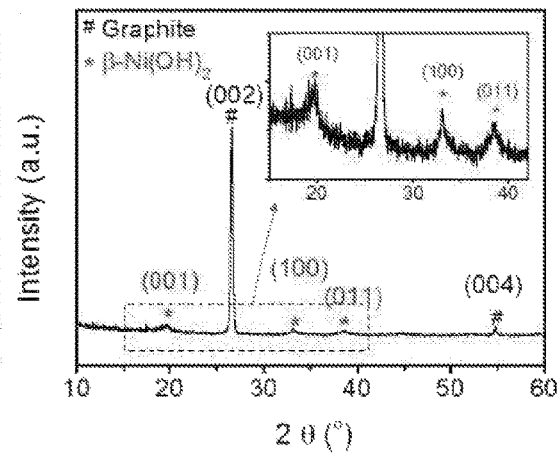
Figure 12A:
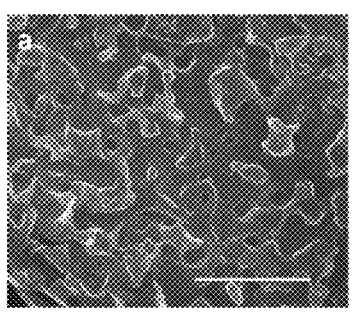
FIGS. 12A to 12G show.
Figure 12C:
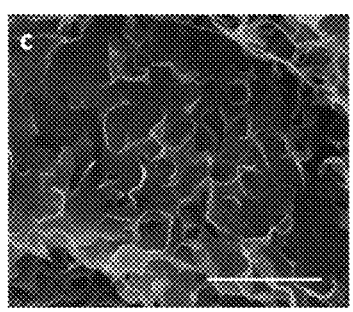
Figure 12E:
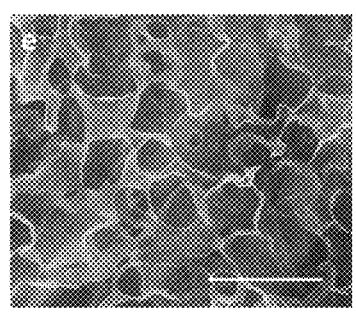
Figure 12B:
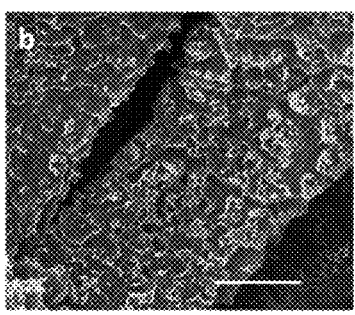
Figure 12D:
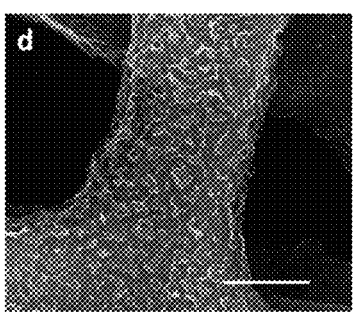
Figure 12F:
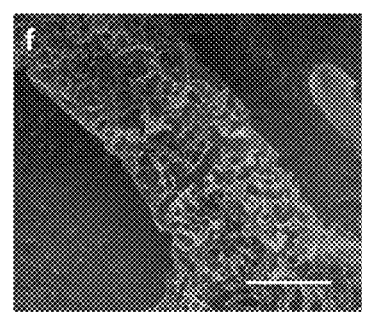
Figure 12G:
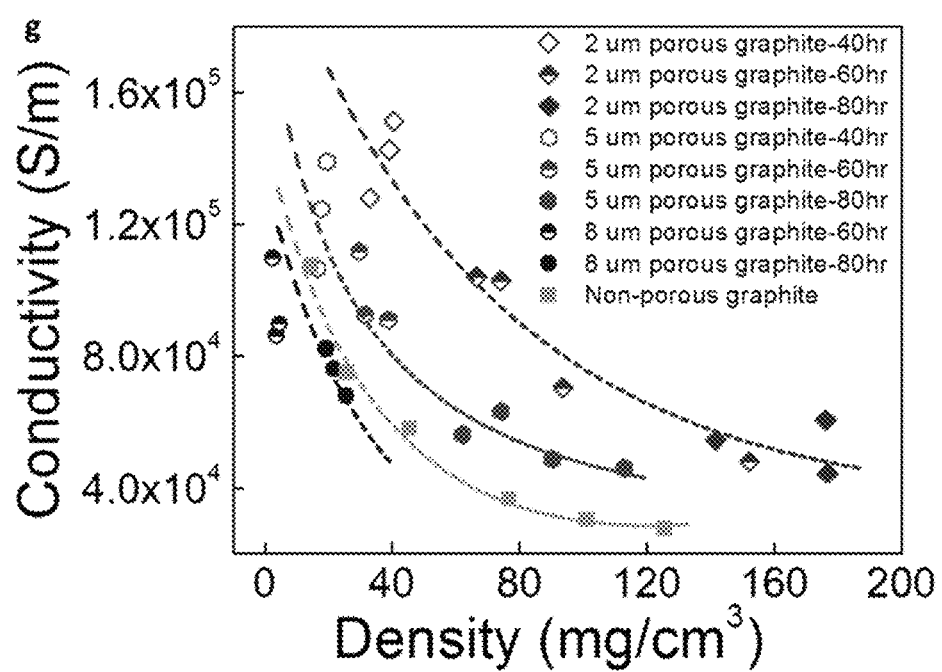

Next, employing such 3-D porous Cu—Ni template, graphite (16) can be readily grown via a low-temperature chemical-vapor-deposition process followed by selective etching of the porous Cu—Ni catalysts [FIGS. 1A-1F]. A piece of porous Cu—Ni superstructure was loaded into the stable heating zone of a tube furnace. A mixture of argon (Ar)/hydrogen ($H_2$) was flushed into the furnace at a rate 20 sccm and 0.15 torr for 0.5 hour. Then the reaction temperature was increased to 600° C. in the presence of Ar/$H_2$ before ethylene was introduced at 20 sccm for 30 minutes. Next, the sample was rapidly cooled to the room temperature. Next, the Cu—Ni alloy was etched in 1 M iron chloride ($FeCl_3$) and 2 M hydrochloride (HCl) at 50-80° C. overnight, freestanding thin-graphite superstructures 18 with two-levels of porosity of ~100 and <10 μm were readily obtained [FIG. 1F and FIG. 2E]. The pores showed smoother features than that of the Cu—Ni template. The pore size is essentially the same as that of Cu—Ni alloy foam, approximately 5 μm here [FIG. 2D]. Note that the pore size of thin-graphite could also be tuned from 2 μm to 8 μm as the Cu—Ni alloy foam [FIGS. 12A-12F]. The conductivity of the 3-D porous multilevel porous graphite is significantly improved than the non-porous graphite and depends on the pore size [FIG. 12G], shown here with a Ni(OH)s layer (20) that is grown on the graphite (18). The lattice fringe in HRTEM [FIG. 2F], the small D band in Raman spectrum [FIG. 3A], and clear diffraction peaks in XRD [FIG. 3B] suggest the high crystallinity of graphite in spite of the low synthetic temperature of 600° C. Note that the symmetrical 2D peak and the high intensity ratio of the G and 2D peaks (>1) of the Raman spectrum further confirmed the as-synthesized material is graphite.

Previously, graphene/thin graphite materials were largely synthesized on Cu[26], Ni[27, 28] or Cu—Ni substrates[29] in methane at 900~1050° C.[39]. The use of ethylene can decrease the required temperature to 750° C.[31], due to a lower dissociating energy required for ethylene. Here, a highly crystalline graphite was obtained at only 600° C., which could be attributed to the higher catalytic activity of Cu—Ni alloys than those of pure Cu or Ni[32]. This low-temperature CVD method is indeed desirable for preserving the fine porous structures of the Cu—Ni alloys for growing graphite.

Figure 4A:
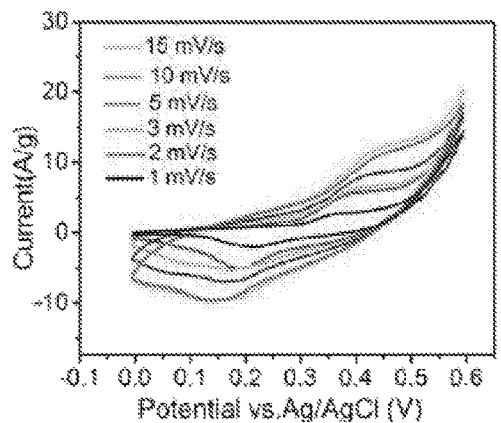
FIGS. 4A to 4F show.
Figure 4B:
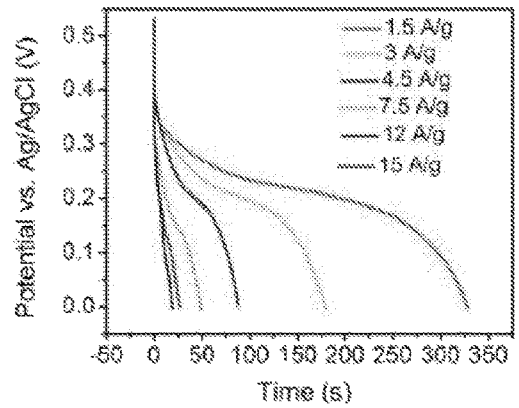
Figure 4C:
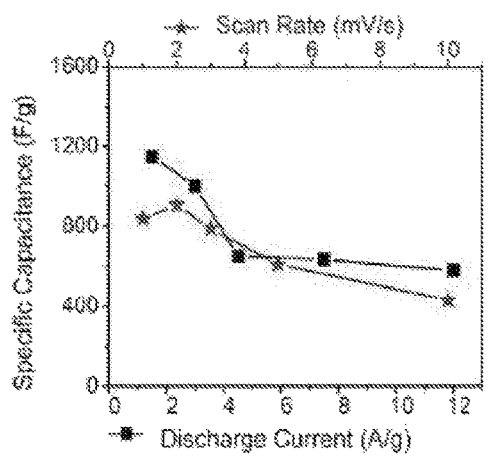
Figure 4D:
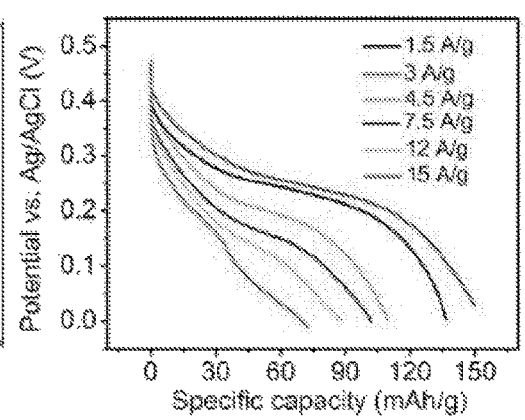
Figure 4E:
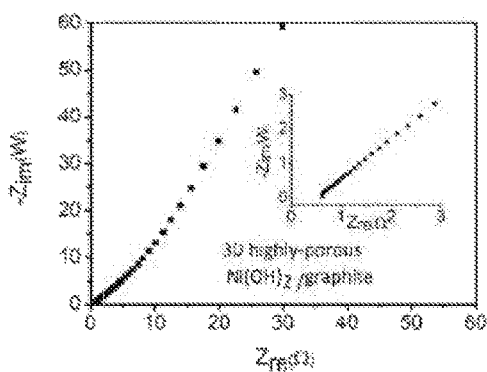
Figure 4F:
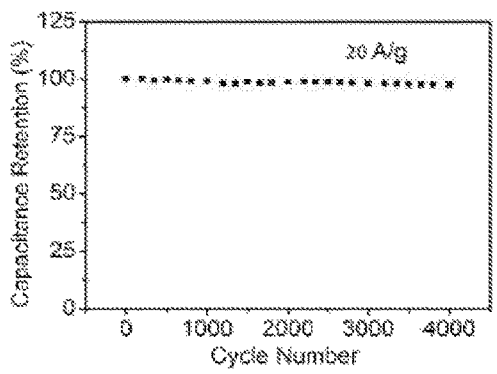
Figure 4I:
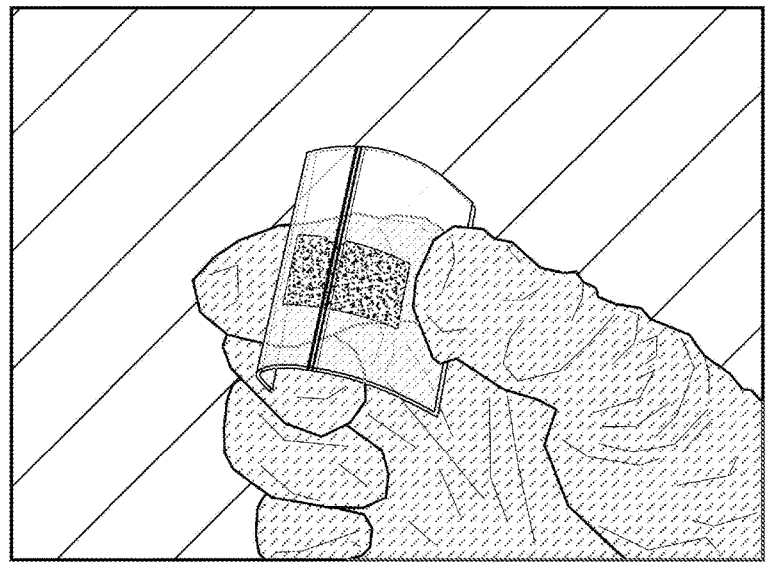
FIG. 4I is a photo of flexible porous graphite/Ni(OH)$_2$.

Moreover, the 3-D porous graphite is flexible and mechanically self-supportive [FIG. 4I and FIG. 1H]. After loaded with energy materials, such as $Ni(OH)_2$ [FIG. 1H], they can be directly applied as electrodes without use of the bonding agents. Note that the bonding agents can reinforce electrodes, but often adversely increase the total weight and decrease the electric conductance of the electrodes. As a result, the mechanical self-supportiveness along with the high electric conductivity and low mass density make the 3-D porous thin-graphite a good candidate for electrochemical energy storage devices.

The present inventors demonstrate herein a multilevel porous graphite superstructure for $Ni(OH)_2$ energy storage devices. $Ni(OH)_2$ is an well-known material for rechargeable alkaline batteries, which is also considered as pseudocapacitive for electrochemical capacitors[33-36]. The present inventors developed a method for the synthesis of Ni(OH)$_2$ electrodes that differs from those in a previous report[22]. First, a porous graphite was treated in 4 M nitric acid (HNO$_3$) at 50° C. for 2 hour to increase the surface hydrophilicity. Then, the material was immersed in a solution mixture of nickel chloride (NiCl$_2$, 7 mM) and urea (40 mM) at 180° C. for 2 hours. The reaction resulted in arrays of hexagonal nanoplates, conformably coated on the entire surface of the porous graphite, with side lengths of ~250 nm and thickness of tens of nanometers [FIGS. 2G-2H]. It was determined as crystalline Ni(OH)$_2$ by XRD measurements [FIG. 3B]. The structure of porous graphite/Ni(OH)$_2$ has an excellent electric conductivity as shown in the Nyquist plot of electrochemical impedance spectrum (EIS), where the equivalent series resistance (ESR) was only 0.8Ω [FIG. 4E].

The electrochemical performance of the porous graphite/Ni(OH)$_2$ was tested in a three-electrode cell setup in a potassium hydroxide solution (KOH, 3 M) with Ag/AgCl and Platinum (Pt) as the reference and counter electrodes, respectively. The performances were analyzed by the cyclic voltammetry (CV) and galvanostatic charge-discharge characterizations. FIG. 4A shows the CV curves at scanning rates from 1-15 mV/sec (0-0.6 V v.s. Ag/AgCl). Different from those nearly rectangular CV curves observed in electric double-layer capacitors, the CV tests of Ni(OH)$_2$/graphite showed two redox peaks, like those of batteries[37]. It is due to the Faradaic redox reactions, often observed on pesudocapacitive materials. The reaction is given as[38].

$Ni(OH)_2 + OH^- \Leftrightarrow NiOOH + H_2O + e^-$.

With the increase of the scan rate, the shapes of the CV curves systematically altered, where the potential of both the anodic and cathodic peaks shifted to the positive and negative potentials, respectively. This effect could be attributed to the slower ion diffusion and less complete redox reactions at higher scanning rates[39, 40]. The specific capacitance (C) can be calculated from C=∫IdV/(vmV), where I is the electric current, v is the potential scan rate, m is the mass of the electrode materials, and V is the potential window. The specific capacitance of the porous graphite/Ni(OH)$_2$ composite was determined as 3125 F/g and 906 F/g (2 mV/s) based on the weight of Ni(OH)$_2$ and the total mass of the porous graphite/Ni(OH)$_2$ electrode, respectively [FIG. 4C]. The value of 3125 F/g calculated from the mass of Ni(OH)$_2$ is among the highest reported for Ni(OH)$_2$ capacitors[41]. The specific capacitance was also obtained from the galvanostatic-discharge measurements (FIG. 4B), given by C=(IΔt)/(mΔV), where I, Δt, m, and ΔV are the discharging current, time, mass of the electrode material, and potential change, respectively. Note that there is a plateau in the discharging curve, which resembles the behavior of batteries[37]. The as-measured specific capacitance reduced with the increase of discharging current (FIG. 4C). A specific capacitance of ~3962 F/g and 1149 F/g was obtained at 1.5 A/g based on the mass of Ni(OH)$_2$ and the total mass of porous graphite/Ni(OH)$_2$, respectively (FIG. 4C). These values are close to those obtained from the CV measurement at a scanning rate of 2 mV/sec. It was found that the specific capacitance decreases with the scanning or discharging rate from 1149 at 1.5 A/g to ~580 F/g at 12 A/g based on the entire mass of the electrode. However, even at the higher discharging rate, the value of ~580 F/g (12 A/g) is still a few times higher than a recent report of 111 F/g obtained at a similar discharging rate (10 A/g)[22]. As previously mentioned, the Ni(OH)$_2$ behaviors like a battery. The specific capacity at different discharging rates [FIG. 4D] was determined. Capacities of 480 mAg/h and 137 mAh/g can be obtained at 1.5 A/g based on the mass of Ni(OH)$_2$ and the entire mass of the Ni(OH)$_2$/graphite electrode, respectively. The electrodes also exhibit good cyclic stability, where the specific capacitance reduced by 2.5% after 4,000 consecutive charge-discharge cycles at a current density of 20 A/g (FIG. 4F). In comparison, most previous work showed a few percentage of capacitance reduction after only 1,000-2,000 cycles[42-44]. Overall, the specific capacitance, capacity, and cyclibility of the Ni(OH)$_2$/graphite electrodes are surprisingly effective when compared to the recent reports as shown in Table 1.

TABLE 1

Comparison of electrochemical measurements in recent publications of Ni(OH)$_2$ supercapacitor electrodes and the present invention.

| Year | Materials | Additives | Supporting Materials and testing conditions | Specific capacitance: Ni(OH)$_2$/ *with graphene/ **total electrode (current density/ scan rate) | Capacitance retention | Specific capacity: Ni(OH)$_2$/ *with graphene/ **total electrode (mAh/g) (Discharging rate) |
|---|---|---|---|---|---|---|
| 2014[1] | Graphite Ni(OH)$_2$ nanosheet | HPMC-10 wt % | Ni Foam 6M KOH 0-1 V (Hg/HgO) | 1956 F/g * N/A ** N/A (1 A/g) | 70% 1000 cycles (10 A/g) | ~278 *N/A ** N/A (1 A/g) |
| 2013[2] | graphite Ni(OH)$_2$ Film | N/A | Ni Foam 6M KOH 0-0.5 V (Ag/AgCl) | ~1560 F/g *N/A **~166 F/g (0.5 A/g) | 65% 1000 cycles (10 A/g) | ~207 *N/A **~22 (1 A/g) |
| 2013[3] | graphite Ni(OH)$_2$ film | AC-80 wt % PVDF-10 wt % AB-10 wt % | Ni Foam 1M KOH 0-0.5 V (Ag/AgCl) | ~2188 F/g *N/A ** N/A (1 mV/s) | 97% 1000 cycles 76% 10000 cycles (100 mV/s) | N/A *N/A **N/A |

TABLE 1-continued

Comparison of electrochemical measurements in recent publications of Ni(OH)$_2$ supercapacitor electrodes and the present invention.

| Year | Materials | Additives | Supporting Materials and testing conditions | Specific capacitance: Ni(OH)$_2$/ *with graphene/ **total electrode (current density/ scan rate) | Capacitance retention | Specific capacity: Ni(OH)$_2$/ *with graphene/ **total electrode (mAh/g) (Discharging rate) |
|---|---|---|---|---|---|---|
| 2013[4] | Graphene Ni(OH)$_2$ film | PTFE-60 wt % hydrogel | Platinum foil 6M KOH 0-0.5 V (Ag/AgCl) | N/A *1327 F/g **N/A (2 A/g) | ~95% 2000 cycles (16 A/g) | ~N/A *~156 **N/A (2 A/g) |
| 2012[5] | graphite Ni(OH)$_2$ film | AM-75% PTFE-5% AB-20% | Ni Foam 6M KOH 0-0.5 V (Hg/HgO) | 1735 F/g * N/A ** N/A (1 mV/s) | N/A | N/A *N/A **N/A |
| 2012[6] | graphite Ni(OH)$_2$ nanosheet | AM-75% PTFE-5% AB-20% | Ni Foam 6M KOH −0.1-0.45 V (SCE) | 2194 F/g * N/A ** N/A (2 mV/s) | 95.7% 2000 cycles (100 mV/s) | N/A *N/A **N/A |
| 2011[7] | Ni foam Ni(OH)$_2$ nanowall | No additive | Ni Foam 1M NaOH 0-0.55 V (SCE) | 2675 F/g * No graphite **~7 F/g (5 mV/cm$^2$) | >96% 500 cycles (30 mV/cm$^2$) | N/A *No graphite **~24 (5 mV/cm$^2$) |
| 2010[8] | graphene Ni(OH)$_2$ nanosheet | PTFE-1% | Ni Foam 3% KOH 0-0.5 V (Ag/AgCl) | 1335 F/g *~935 F/g ** N/A (2.8 A/g) | ~100% 2000 cycles (28.6 A/g) | ~250 *~170 ** N/A (2.8 A/g) |
| 2008[9] | Ni foam Ni(OH)$_2$ nanosheet | No additive | Ni Foam 1M NaOH −0.05-0.55 V (SCE) | 3125 F/g * No graphite **~39 F/g (4 A/g) | ~48% 300 cycles (4 A/g) | ~444 *No graphite **~6 (4 A/g) |
| This work | Porous graphite/ Ni(OH)$_2$ sheet | No additive | Self supported 1M KOH 0-0.6 V (Ag/AgCl) | 3125 F/g (2 mV/s) *1149 F/g **1149 F/g (1.5 A/g) | 97.5% 4,000 cycles (20 A/g) | 480 *137 **137 (1.5 A/g) |

Footnotes:
Commercial available substrates were used. The density of commercially available 1.6 mm thick Ni foams and 0.1 mm Ti foil s are ~40 mg/cm$^2$ and ~45 mg/cm$^2$, respectively. All the parameters in the table have been given on the base of the three-electrode systems. (PTFE: poly(tetrafluoroethylene); AM: active materials; AB: acetylene black or carbon black; PVDF: polyvinylidene difuoride.)
Table references:
[1]Zhang, J. T.; Liu, S.; Pan, G. L.; Li, G. R.; Gao, X. P. Journal of Materials Chemistry A 2014, 2, 1524-1529.
[2]Ji, J. Y.; Zhang, L. L.; Ji, H. X.; Li, Y.; Zhao, X.; Bai, X.; Fan, X. B.; Zhang, F. B.; Ruoff, R. S. Acs Nano 2013, 7, (7), 6237-6243.
[3]Li, H. B.; Yu, M. H.; Wang, F. X.; Liu, P.; Liang, Y.; Xiao, J.; Wang, C. X.; Tong, Y. X.; Yang, G. W. Nat Commun 2013, 4.
[4]Xu, Y. X.; Huang, X. Q.; Lin, Z. Y.; Zhong, X.; Huang, Y.; Duan, X. F. Nano Res 2013, 6, (1), 65-76.
[5]Yan, J.; Fan, Z. J.; Sun, W.; Ning, G. Q.; Wei, T.; Zhang, Q.; Zhang, R. F.; Zhi, L. J.; Wei, F. Adv Funct Mater 2012, 22, (12), 2632-2641.
[6]Yan, J.; Sun, W.; Wei, T.; Zhang, Q.; Fan, Z. J.; Wei, F. J Mater Chem 2012, 22, (23), 11494-11502.
[7]Lu, Z. Y.; Chang, Z.; Zhu, W.; Sun, X. M. Chem Commun 2011, 47, (34), 9651-9653.
[8]Wang, H. L.; Casalongue, H. S.; Liang, Y. Y.; Dai, H. J. J Am Chem Soc 2010, 132, (21), 7472-7477.
[9]Yang, G. W.; Xu, C. L.; Li, H. L. Chem Commun 2008, (48), 6537-6539.

It was also important to compare the performance of the Ni(OH)$_2$/porous graphite with Ni(OH)$_2$/non-porous graphite. A control sample of Ni(OH)$_2$ grown on the non-porous thin graphite (obtained from non-porosified Ni foams) showed inferior electrochemical performances (FIGS. 4G-A-FIG. 4G-B and FIGS. 4H-A-4H-D). The specific capacitance was 231 F/g at 1 A/g (based on the total mass of the electrode) (FIGS. 4H-A-4H-D). This result is close to that reported previously but using a more simple and straightforward method[22]. It was found that, in the previous work, polymer binders were added to improve the mechanical strength of the electrodes, which are not necessary for use with the present invention. If the actual weight of polymer binders was included towards the total weight of the electrode, the specific capacitance could be much lowered to 1238 F/g[22]. As a result, both the control experiments and previous work support the substantial enhancement of the energy material of Ni(OH)$_2$ by using the 3-D multilevel porous thin graphite made using the method of the present invention.

Figure 6A:
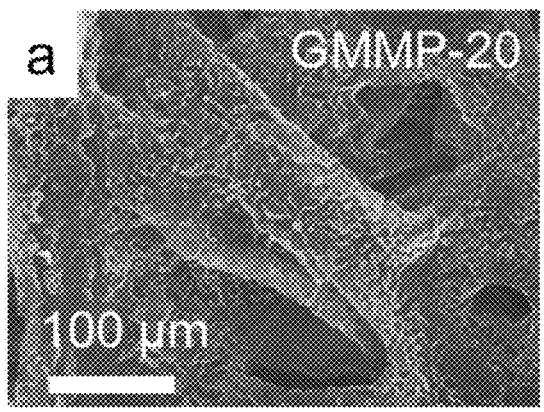
FIGS. 6A to 6F show: SEM images of Mn$_3$O$_4$ grown on 3-D thin graphite with two-level porosity for (FIGS. 6A-6C) 20 minutes and (FIGS. 6D-6F) 30 minutes, respectively.
Figure 6D:
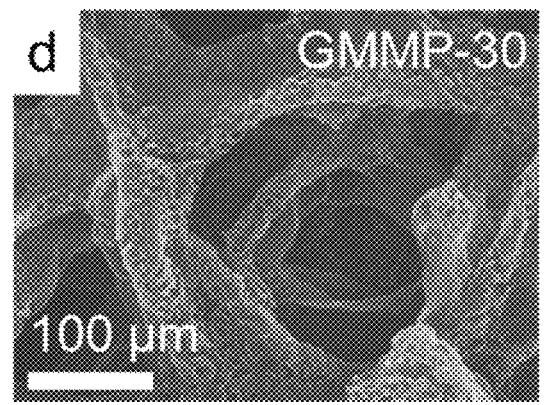
Figure 6B:
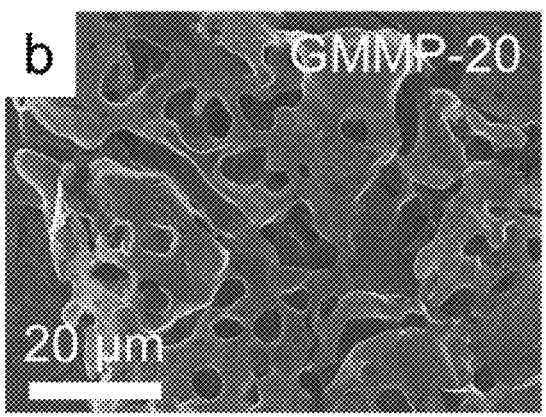
Figure 6E:
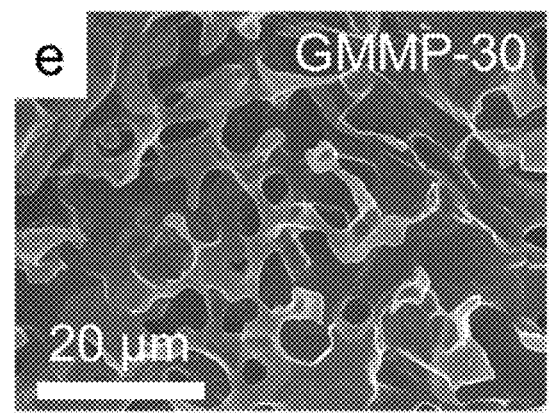

Mn$_3$O$_4$ is an also advantageous pseudocapacitive material with low cost, environmental compatibility, and large capacity[45]. The synthesis began with the treatment of porous graphite in a nitric acid solution (HNO$_3$, 4 M) at 50° C. for 2 hours to increase the surface hydrophilicity. Next, a piece of thin graphite was immersed in a 30 mL autoclave containing a solution mixture made of potassium permanganate (KMnO$_4$, 0.1 mol/L) and sodium nitrite (0.1 mol/L NaNO$_3$). The reaction was kept at 150° C. for 20 to 30 minutes. The temperature was reduced to the room temperature naturally and the porous graphite/$Mn_3O_4$ nanosuperstructures were obtained after washing by D.I. water and drying in air. A series of graphite-$Mn_3O_4$ samples were synthesized in this manner by varying the reaction time and the growth substrates. The testing samples include graphite/$Mn_3O_4$ with multi-level porosity reacted for 20 minutes (GMMP-20, FIGS. 6A-6C) and 30 minutes (GMMP-30, FIGS. 6D-6F), respectively; graphite/$Mn_3O_4$ with single-level porosity reacted for 20 minutes (GMSP-20, FIGS. 7A-7C) and 30 minutes (GMSP-30, FIGS. 7D-7F), respectively. Here the samples of graphite/$Mn_3O_4$ with single-level of porosity were fabricated for control experiments.

Figure 5A:
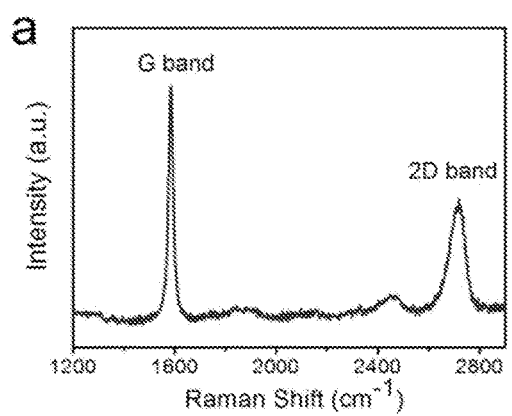
FIGS. 5A and 5B show.
Figure 5B:
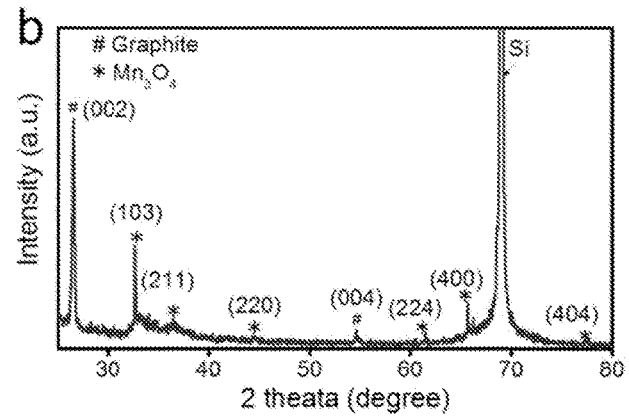

For as-fabricated graphite/$Mn_3O_4$ nanostructures, the XRD diffraction patterns confirm the high crystallinity of both graphite and $Mn_3O_4$ [Raman Shift FIG. 5A and FIG. 5B]. The 3-D thin graphite/$Mn_3O_4$ with multilevel porosities, including GMMP-20 [FIG. 6C], have $Mn_3O_4$ nanocrystals distributed on the surfaces of the thin graphite essentially uniformly with a size of 10-20 nm. The $Mn_3O_4$ [FIG. 6C] nanocrystals obtained after reactions for 20 minutes (GMMP-20) exhibited a ~32% in surface coverage. For the control samples, similar $Mn_3O_4$ nanocrystals were synthesized on the single-level porous graphite after reaction for 20 min [GMSP-20, FIG. 7A]. When the reaction time was increased to 30 minutes, the morphology of $Mn_3O_4$ was changed to nanosheets [GMMP-30, FIG. 7D]. This change could be attributed to the longer reaction time and the smaller available surface area, resulting in coalescence and transformation of nanoparticles.

Characterization of the electrochemical supercapacitive performance of the GMMP and the control samples of GMSP were carried out by cyclic voltammetry and galvanostatic charging-discharging of half-cells. A three-electrode cell setup was used with Graphite/$Mn_3O_4$ as the working electrode, Ag/AgCl as the reference electrode, platinum (Pt) serving and counter electrode, and potassium hydroxide ($Na_2SO_4$) solutions (1 M) as the electrolyte. From the CV measurement results, with increment of the scanning rates, the CV curves systematically deviated while remained symmetrically, which could be due to the incomplete electrochemical reactions at higher scan rates. The specific electrochemical capacitance (C) can be calculated from $C=\int IdV/(vmV)$, where I is the electric current, v is the potential scan rate, m is the mass of the electrode materials, and V is the potential window. The highest specific capacitance was obtained from GMMP-20 with a value of 407 F/g at 1 mV/s, based on the total weight of the electrode. This value is much higher than those found from GMSP-30 (201 F/g) (FIGS. 10A and 10B) obtained at the same scanning rate.

Figure 10A:
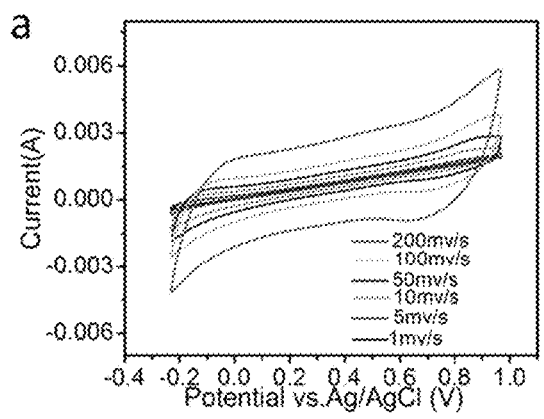
FIGS. 10A and 10B, show (FIG. 10A) CV curves of the graphite/Mn$_3$O$_4$ with single-level porosity (GMSP-30) at scanning rates from 1 to 200 mV/s.
Figure 10B:
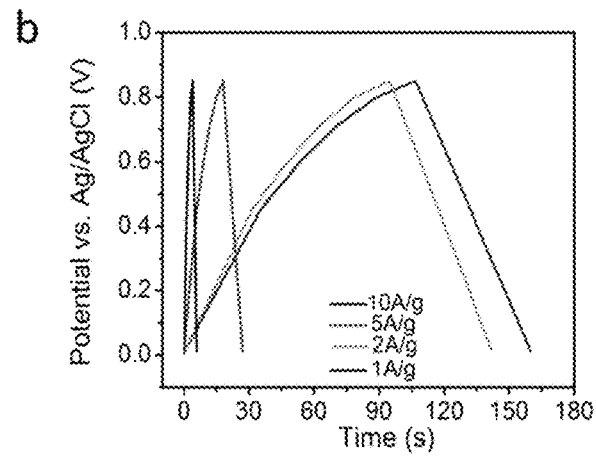

As shown in FIG. 9, a synthesized 3-D thin graphite with a single-level of porosity (100 μm in feature size) directly from the Ni foams. FIGS. 10A and 10B, compared to or GMSP-30 (~201 F/g), GMMP-20 samples were fabricated on a substrate with ~4-time larger specific surface areas (per unit mass) due to the presence of two levels of porosity and less mass per unit area. A specific capacitance as high as ~407 F/g was achieved.

Figure 6C:
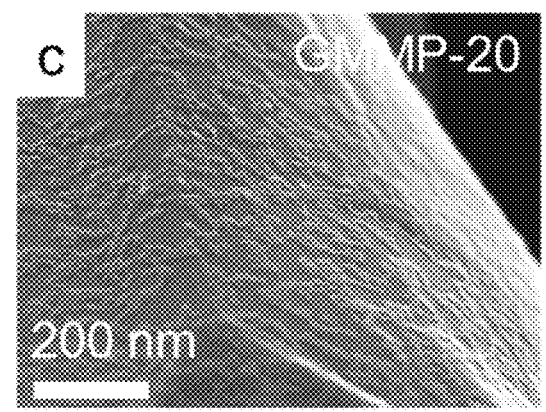
Figure 6F:
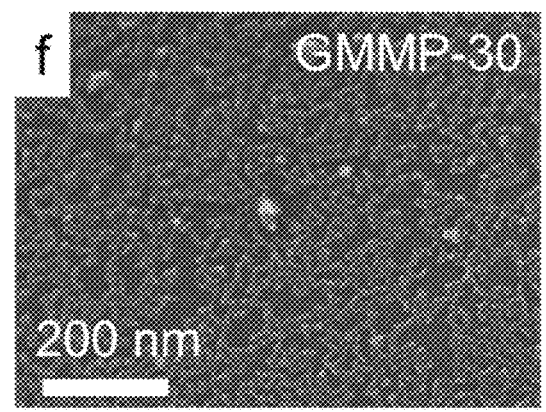
Figure 7A:
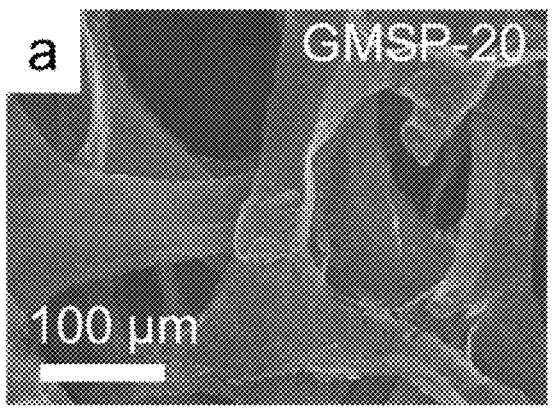
FIGS. 7A to 7F show: SEM images of Mn$_3$O$_4$ grown on simple 3-D thin graphite with one level of porosity of ~100 µm for (FIGS. 7A-7C) 20 minutes and (FIGS. 7D-7F) 30 minutes, respectively. GMSP: the graphite/Mn$_3$O$_4$ with single-level porosity.
Figure 7D:
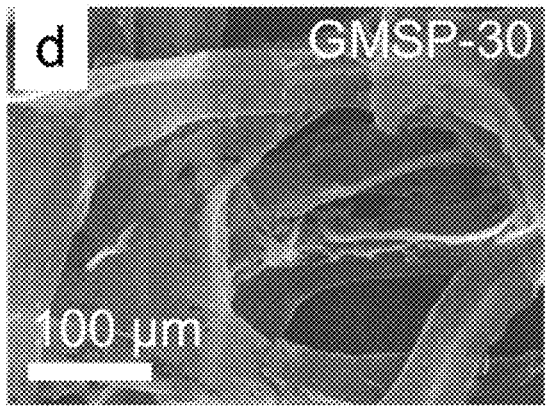
Figure 7B:
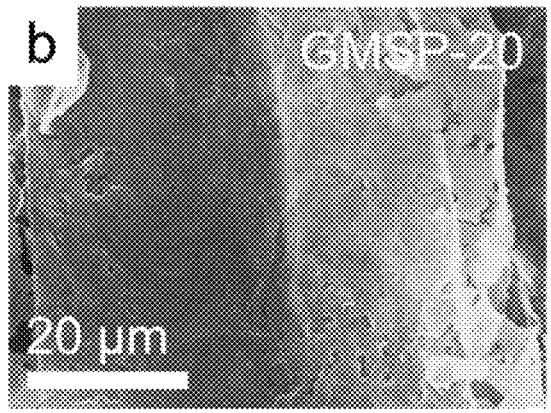
Figure 7E:
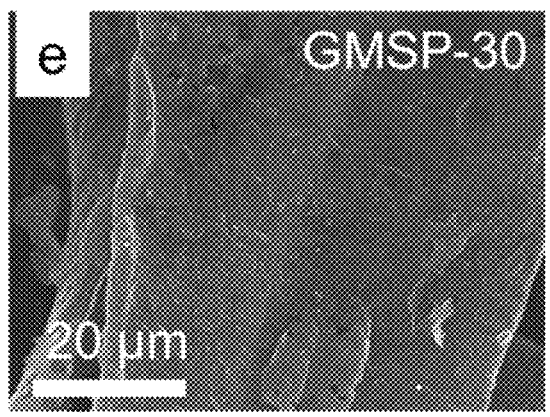
Figure 7C:
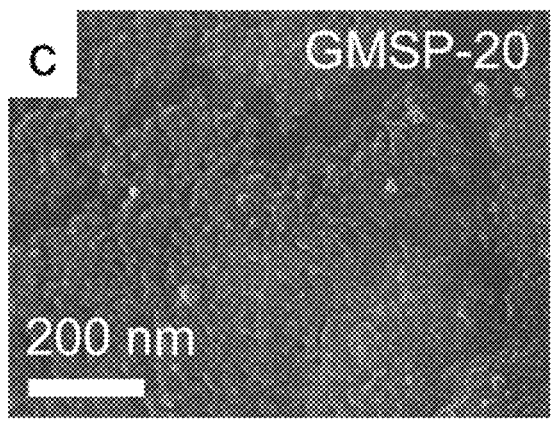
Figure 7F:
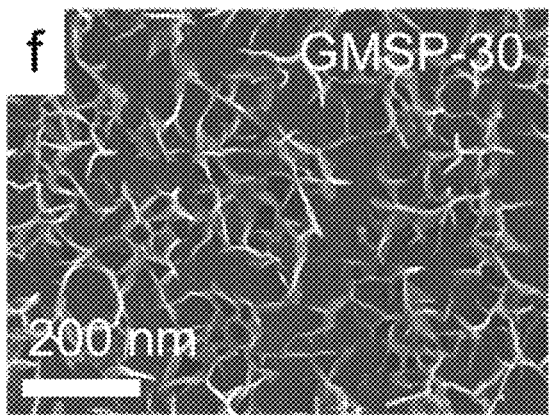

To further confirm the results obtained from the CV measurement, the present inventors determined the specific capacitance by using the galvanostatic charging-discharging characterization as shown in FIG. 6C. The highest specific capacitance of ~399 F/g, based on the total weight of the electrode, such a value is close to that obtained from the CV measurement. These values are consistently higher than those reported recently of 107, 88, and 85 F/g at 2, 5, and 10 A/g, respectively[45].

FIGS. 8A to 8D show: (FIG. 8A) CV curves of the graphite/$Mn_3O_4$ with multilevel porosity (GMMP-20) at scanning rates from 1 to 200 mV/s. (FIG. 8B) Charging-discharging curves of the graphite/$Mn_3O_4$ with multilevel porosity (GMMP-20) from 1 to 10 A/g. The porous graphite/$Mn_3O_4$ with two levels of porosity (GMMP-30, GMMP-20) has high electric conductivity, as measured by the electrochemical impedance spectroscopy (EIS) (100 kHz to 0.01 Hz, FIG. 8C). The Nyquist plots of GMMP-30 and GMMP-20 show features with an arc and a spike at a high and a low frequency regime, respectively. Fitted with the equivalent circuit diagram [inset of FIG. 8C], the electrolyte resistance (Rs), charge transfer resistance (Rct), double layer capacitance (Cp), and the constant phase element ($C_{PE}$) for the redox reaction of $Mn_3O_4$ can be readily determined. The GMMP-30 and GMMP-20 exhibited small equivalent series resistances.

In addition to the ultrahigh specific capacitance as demonstrated above, the 3D freestanding graphite/$Mn_3O_4$ with multilevel porosity also showed superb long-term cycle stability. At a current density of 10 A/g, the charge-discharge cycling showed capacitance-retentions of 99.5% and 90% after 2500 and 10000 sequential cycles, respectively (FIG. 8D), which could be attributed to the mechanical and chemical robustness of the porous graphite/$Mn_3O_4$.

What contributes to the high performances of porous graphite/$Ni(OH)_2$ as well as the graphite/$Mn_3O_4$. By way of explanation, and in no way a limitation of the present invention, using porous graphite/$Ni(OH)_2$ as an example and ascribe it to three factors: first, although $Ni(OH)_2$ was synthesized at the same reaction conditions, the morphology of $Ni(OH)_2$ nanostructures on porous graphite are distinct from those grown on 3-D non-porous graphite in control experiments herein and the previous report[22]. The $Ni(OH)_2$ nanoplates uniformly and tightly grew on the porous graphite. The coating is conformable with an overall thickness estimated as ~25 nm (FIG. 2H inset). While, for the non-porous graphite, flower-like $Ni(OH)_2$ with thickness of ~150 nm were grown relatively loosely on graphite (FIG. 4I). The increased thickness and less well defined attachment of $Ni(OH)_2$ can result in higher total weight of $Ni(OH)_2$ and less effective charge storage in $Ni(OH)_2$. Second, the multilevel porous graphite offers a specific surface area with at least four time improvement than that of the 3-D graphite made in the control experiment, with ~2 time increase in surface area and ~2 time reduction in the total weight of the same sample volume. Moreover, no additive is necessary for the porous graphite electrodes of the present invention, which further reduced the total weight of the electrodes.[22] As a result, a much higher specific capacitance could can be obtained due to the larger specific areas of the multilevel porous graphite/$Ni(OH)_2$. Third, the substantially enhanced specific area can result in more facile ionic transport[46]. It also directly increased the electric double-layer capacitance[47], which also contributed to the measured total specific capacitance.

In summary, the present invention includes a novel approach for the synthesis of 3-D multilevel porous graphite superstructures using engineered porous Cu—Ni alloys as catalysts. The graphite superstructures were applied as supports for $Ni(OH)_2$ energy storage devices, which offer a specific capacitance of ~1149 F/g at a current densities of 1.5 A/g (or 137 mAh/g in specific capacity), based on the entire mass of graphite/$Ni(OH)_2$ electrode. The devices also exhibit excellent cyclibility with 97.5% capacitance retention after 4,000 cycles. The performances are among the best reported previously. The high specific capacitance and long durability of the supercapacitors could be attributed to the high specific surface area, excellent crystalline quality, controlled 3-D assembly of $Ni(OH)_2$, and good electric conductivity. The 3-D porous graphite/$Ni(OH)_2$ composites are also advantageously flexible and self-supportive, which can be directly applied as electrodes without binders or additives. The graphite coated with $Mn_3O_4$ nanocrystals was demonstrated as electrode for supercapacitors. It offered a specific capacitance as high as 407 F/g at 1 mV/s and 399 F/g at 1 A/g, based on the total weight of the electrodes. The devices also exhibit long cycle stability with capacitance retentions of 99.5% after 2,500 charge-discharge cycles and 90% after 10,000 cycles at a current of 10 A/g. Overall, the reported mechanism for the synthesis of 3-D porous graphite is rational, controllable, and at a low cost, which could spur a new paradigm for manufacturing an array of energy storage and conversion devices.

Materials characterizations. The morphology, microstructure, and elemental composition of the composite materials were characterized by a Hitachi S-5500 SEM equipped with STEM and energy dispersive spectroscopy detector (Bruker EDS Quantax 4010), High-Resolution TEM (JEOL 2010F), XRD (Philips automated vertical scanning general powder diffractometers), and Raman spectroscopy (Princeton instrument Inc. and Olympus IX 71). The specific surface area was measured by the Brunauer, Emmett and Teller (BET) method. All the materials were weighed by a high precision electronic balance (CAHN-C30). An electrochemistry workstation (Princeton Applied Research) was used for electrochemical deposition and characterization.

Measurements and calculations of the specific surface area. The volumetric specific surface areas of Ni foam and porous Cu—Ni foam were characterized by multi-point BET Surface Area Analysis (Pacific Surface Science Inc.). The volume specific surface areas of Ni foam and porous Cu—Ni were determined as 0.0532 $m^2/cm^3$ and 0.096 $m^2/cm^3$, respectively.

Then, the volumetric specific surface area of non-porous graphite and porous graphite can be estimated from Ni foam and porous Cu—Ni foam, respectively. Considering the Ni or Cu—Ni etching process resulted double sided (inner/outer) graphite, the volume specific surface area of porous and non-porous graphite became 0.192 $m^2/cm^3$ and 0.103 $m^2/cm^3$, respectively.

Of the same volume of 1 cm×1 cm×0.02 cm, the masses of porous and non-porous graphite/$Ni(OH)_2$ were measured as 0.2 mg and 0.5 mg, respectively. As a result, the specific surface area normalized by weight could be estimated as 19.2 $m^2/g$ for porous graphite/$Ni(OH)_2$, and 4.12 $m^2/g$ for non-porous one graphite/$Ni(OH)_2$. Note that the estimations shown above didn't take account of the surface area contribution from $Ni(OH)_2$ for either porous or non-porous graphite/$Ni(OH)_2$. Specific mass (mass per unit size) information of the $Mn_3O_4$/graphite: GMMP-30 0.37 $mg/cm^2$, GMSP-30 0.59 $mg/cm^2$, GMMP-20 0.31 $mg/cm^2$ and GMSP-20 0.48 $mg/cm^2$.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

1. Iijima, S.; Ichihashi, T. Nature 1993, 363, (6430), 603-605.
2. Treacy, M. M. J.; Ebbesen, T. W.; Gibson, J. M. Nature 1996, 381, (6584), 678-680.
3. Ebbesen, T. W.; Ajayan, P. M. Nature 1992, 358, (6383), 220-222.
4. Dravid, V. P.; Lin, X.; Wang, Y.; Wang, X. K.; Yee, A.; Ketterson, J. B.; Chang, R. P. H. Science 1993, 259, (5101), 1601-1604.
5. Kroto, H. W.; Heath, J. R.; O'Brien, S. C.; Curl, R. F.; Smalley, R. E. Nature 1985, 318, (6042), 162-163.
6. Novoselov, K. S.; Geim, A. K.; Morozov, S. V.; Jiang, D.; Katsnelson, M. I.; Grigorieva, I. V.; Dubonos, S. V.; Firsov, A. A. Nature 2005, 438, (7065), 197-200.
7. Ferrari, A. C.; Meyer, J. C.; Scardaci, V.; Casiraghi, C.; Lazzeri, M.; Mauri, F.; Piscanec, S.; Jiang, D.; Novoselov, K. S.; Roth, S.; Geim, A. K. Physical Review Letters 2006, 97, (18).
8. Nair, R. R.; Blake, P.; Grigorenko, A. N.; Novoselov, K. S.; Booth, T. J.; Stauber, T.; Peres, N. M. R.; Geim, A. K. Science 2008, 320, (5881), 1308-1308.
9. Pettes, M. T.; Ji, H. X.; Ruoff, R. S.; Shi, L. Nano Lett. 2012, 12, (6), 2959-2964.
10. Berger, C.; Song, Z.; Li, T.; Li, X.; Ogbazghi, A. Y.; Feng, R.; Dai, Z.; Marchenkov, A. N.; Conrad, E. H.; First, P. N.; de Heer, W. A. The Journal of Physical Chemistry B 2004, 108, (52), 19912-19916.
11. Banos, E.; Demir, N.; Souza Filho, A.; Mendes Filho, J.; Jorio, A.; Dresselhaus, G.; Dresselhaus, M. Phys Rev B 2005, 71, (16).
12. Levi, M. D.; Aurbach, D. J Electroanal Chem 1997, 421, (1-2), 79-88.
13. Richey, F. W.; Dyatkin, B.; Gogotsi, Y.; Elabd, Y. A. J. Am. Chem. Soc. 2013, 135, (34), 12818-12826.
14. Jost, K.; Stenger, D.; Perez, C. R.; McDonough, J. K.; Lian, K.; Gogotsi, Y.; Dion, G. Energy & Environmental Science 2013, 6, (9), 2698.
15. Chen, W.; Rakhi, R. B.; Hu, L.; Xie, X.; Cui, Y.; Alshareef, H. N. Nano Lett 2011, 11, (12), 5165-5172.
16. McDonough, J. R.; Choi, J. W.; Yang, Y.; La Mantia, F.; Zhang, Y.; Cui, Y. Appl Phys Lett 2009, 95, (24), 243109.
17. Zheng, G.; Hu, L.; Wu, H.; Xie, X.; Cui, Y. Energ Environ Sci 2011, 4, (9), 3368.
18. Geim, A. K.; Novoselov, K. S. Nat Mater 2007, 6, (3), 183-191.
19. Yang, X. W.; Cheng, C.; Wang, Y. F.; Qiu, L.; Li, D. Science 2013, 341, (6145), 534-537.
20. Xie, J. F.; Sun, X.; Zhang, N.; Xu, K.; Zhou, M.; Xie, Y. Nano Energy 2013, 2, (1), 65-74.
21. Wang, H. L.; Casalongue, H. S.; Liang, Y. Y.; Dai, H. J. J. Am. Chem. Soc. 2010, 132, (21), 7472-7477.
22. Ji, J. Y.; Zhang, L. L.; Ji, H. X.; Li, Y.; Zhao, X.; Bai, X.; Fan, X. B.; Zhang, F. B.; Ruoff, R. S. Acs Nano 2013, 7, (7), 6237-6243.
23. Jun, S.; Joo, S. H.; Ryoo, R.; Kruk, M.; Jaroniec, M.; Liu, Z.; Ohsuna, T.; Terasaki, O. J Am Chem Soc 2000, 122, (43), 10712-10713.
24. Wang, D. W.; Li, F.; Liu, M.; Lu, G. Q.; Cheng, H. M. Angew Chem Int Edit 2008, 47, (2), 373-376.
25. Murray, G.; White, C. V.; Weise, W., Introduction to Engineering Materials: Behavior: Properties, and Selection. CRC Press: 2007.
26. Li, X. S.; Cai, W. W.; An, J. H.; Kim, S.; Nah, J.; Yang, D. X.; Piner, R.; Velamakanni, A.; Jung, I.; Tutuc, E.; Banerjee, S. K.; Colombo, L.; Ruoff, R. S. Science 2009, 324, (5932), 1312-1314.
27. Reina, A.; Thiele, S.; Jia, X. Nano Res 2009, 2, (6), 509-516.
28. Baraton, L.; He, Z.; Lee, C. S.; Maurice, J.-L.; Cojocaru, C. S.; Gourgues-Lorenzon, A.-F.; Lee, Y. H.; Pribat, D. Nanotechnology 2011, 22, (8), 085601.
29. Chen, S. S.; Cai, W. W.; Piner, R. D.; Suk, J. W.; Wu, Y. P.; Ren, Y. J.; Kang, J. Y.; Ruoff, R. S. Nano Lett. 2011, 11, (9), 3519-3525.
30. Muñoz, R.; Gómez-Aleixandre, C. Chemical Vapor Deposition 2013, 19, 297-322.
31. Wang, R.; Hao, Y. F.; Wang, Z. Q.; Gong, H.; Thong, J. T. L. Nano Lett 2010, 10, (12), 4844-4850.
32. Chen, S.; Cai, W.; Piner, R. D.; Suk, J. W.; Wu, Y.; Ren, Y.; Kang, J.; Ruoff, R. S. Nano Lett 2011, 11, (9), 3519-3525.
33. Yan, J.; Sun, W.; Wei, T.; Zhang, Q.; Fan, Z.; Wei, F. J Mater Chem 2012, 22, (23), 11494-11502.
34. Wang, H. L.; Liang, Y. Y.; Mirfakhrai, T.; Chen, Z.; Casalongue, H. S.; Dai, H. J. Nano Res 2011, 4, (8), 729-736.
35. Wang, H. L. Pure Appl Chem 2014, 86, (1), 39-52.
36. Yan, J.; Fan, Z. J.; Sun, W.; Ning, G. Q.; Wei, T.; Zhang, Q.; Zhang, R. F.; Zhi, L. J.; Wei, F. Adv Funct Mater 2012, 22, (12), 2632-2641.
37. Simon, P.; Gogotsi, Y.; Dunn, B. Science 2014, 343, (6176), 1210-1211.
38. Lang, J. K., L.; Wu, W.; Liu, M.; Luo, Y. J Solid State Electr 2009, 13, 333-340.
39. Patil, U. M.; Gurav, K. V.; Fulari, V. J.; Lokhande, C. D.; Joo, 0. S. J Power Sources 2009, 188, (1), 338-342.
40. Lee, J. W.; Ahn, T.; Soundararajan, D.; Ko, J. M.; Kim, J. D. Chem Commun 2011, 47, (22), 6305-6307.
41. Lu, Z. Y.; Chang, Z.; Zhu, W.; Sun, X. M. Chem Commun 2011, 47, (34), 9651-9653.
42. Zhang, J. T.; Liu, S.; Pan, G. L.; Li, G. R.; Gao, X. P. Journal of Materials Chemistry A 2014, 2, 1524-1529.
43. Li, H. B.; Yu, M. H.; Wang, F. X.; Liu, P.; Liang, Y.; Xiao, J.; Wang, C. X.; Tong, Y. X.; Yang, G. W. Nat Commun 2013, 4.
44. Xu, Y. X.; Huang, X. Q.; Lin, Z. Y.; Zhong, X.; Huang, Y.; Duan, X. F. Nano Res 2013, 6, (1), 65-76.
45. Lee, J. W.; Hall, A. S.; Kim, J.-D.; Mallouk, T. E. Chem Mater 2012, 24, (6), 1158-1164.
46. Ghosh, A.; Lee, Y. H. Chemsuschem 2012, 5, (3), 480-499.
47. Antonino Salvatore Aricò; Peter Bruce; Scrosati, B. Nat Mater 2005, 4, 366-377.

What is claimed is:

1. A three dimensional graphite structure with a controlled porosity made by a method comprising:
   plating a metal layer on at least one of a nickel, an iron or a cobalt foam substrate;
   annealing the metal and the nickel, iron or cobalt foam into a porous metal-nickel, iron or cobalt catalyst, wherein the catalyst has a smooth and a porous surface;
   etching smooth surface of the annealed porous metal-nickel, iron or cobalt catalyst;
   growing a graphite layer on the porous surface of the annealed porous metal-nickel, iron or cobalt catalyst; and
   completely etching the porous metal-nickel, iron or cobalt catalyst to obtain the graphite layer,
   wherein the three dimensional graphite structure has multiple levels of pores having different porosities comprising a first level of pores and a second level of pores wherein the second level of pores have a smaller pore size and are disposed on the walls of said first level of pores.

2. The graphite structure of claim 1, wherein the graphite is deposited on the annealed porous copper-nickel catalyst by at least one of chemical vapor deposition, plasma enhanced chemical vapor deposition or sputtering.

3. The graphite structure of claim 1, wherein the metal is a catalyst for graphene/graphite growth.

4. The graphite structure of claim 1, wherein the metal is copper, nickel, iron, cobalt, gold, platinum, or rhodium, but the metal is different from the foam material.

5. The graphite structure of claim 1, wherein the step of plating the metal is selected from at least one of electroplating or electroless plating.

6. The graphite structure of claim 1, wherein the graphite is deposited on the annealed porous copper-nickel catalyst by chemical vapor deposition in ethylene at between 600-700° C.

7. The graphite structure of claim 1, wherein the graphite layer is freestanding and flexible.

8. The graphite structure of claim 1, wherein the conductivity of the graphite structure with 2 μm porosity is improved by three (3) times when compared to that of a graphite structure without porosity.

9. The graphite structure of claim 1, further comprising the step of growing a metal hydroxide layer on the graphite layer.

10. The graphite structure of claim 1, further comprising the step of growing at least one of a metal hydroxide, an oxide or a sulfide layer on the graphite layer, wherein the metal hydroxide/oxide/sulfide is selected from at least one of ruthenium (IV) oxide; aluminum hydroxide; beryllium hydroxide; cobalt (II) hydroxide; cobalt oxide; copper (II) hydroxide; copper oxide; curium hydroxide; gold (III) hydroxide; iron (II) hydroxide; iron oxide; mercury (II) hydroxide; nickel (II) hydroxide; nickel oxide; nickel sulfide; manganese oxide ($MnO_2$ or $Mn_3O_4$); manganese sulfide; tin (II) hydroxide; tin (IV) oxide; uranyl hydroxide; zinc hydroxide; zirconium (IV) hydroxide; gallium (III) hydroxide; lead (II) hydroxide; or thallium hydroxide.

11. The graphite structure of claim 1, wherein the graphite layer is formed into an electrode support for metal hydroxide supercapacitors.

12. The graphite structure of claim 1, wherein the graphite layer with a metal hydroxide/oxide/sulfide is formed into an electrode having a specific capacitance of at least 1149 F/g at a current density of 1.5 A/g.

13. The graphite structure of claim 1, wherein the graphite layer with a metal hydroxide/oxide/sulfide is formed into an electrode having at least 97.5% capacitance retention after 4,000 cycles.

14. The graphite structure of claim 1, wherein the graphite layer with a metal hydroxide/oxide/sulfide is formed into an electrode having at least 90% capacitance after 10,000 cycles.

15. The graphite structure of claim 1, further comprising the step of adjusting the porosity of the nickel foam substrate to change the porosity of the graphite layer by controlling at least one of the copper deposition amount, annealing temperature, and annealing time.

16. The graphite structure of claim 1, wherein the step of etching the copper-nickel catalyst is defined further as selecting an etching agent that etches the annealed porous noble metal-nickel, iron or cobalt.

17. The graphite structure of claim 1, wherein the step of etching the copper-nickel catalyst is defined further as etching the copper-nickel catalyst in 1 M iron chloride ($FeCl_3$) and 2 M hydrochloride (HCl) at 50-80° C. overnight.

18. The graphite structure of claim 1, wherein the multi-level porosity comprises a first level of pores having a porosity of approximately 100 μm, and a second level of pores having of porosity of less than 10 μm.

19. The graphite structure of claim 18, wherein the second level of porosity is from 2 μm to 8 μm.

* * * * *